Figure 1:
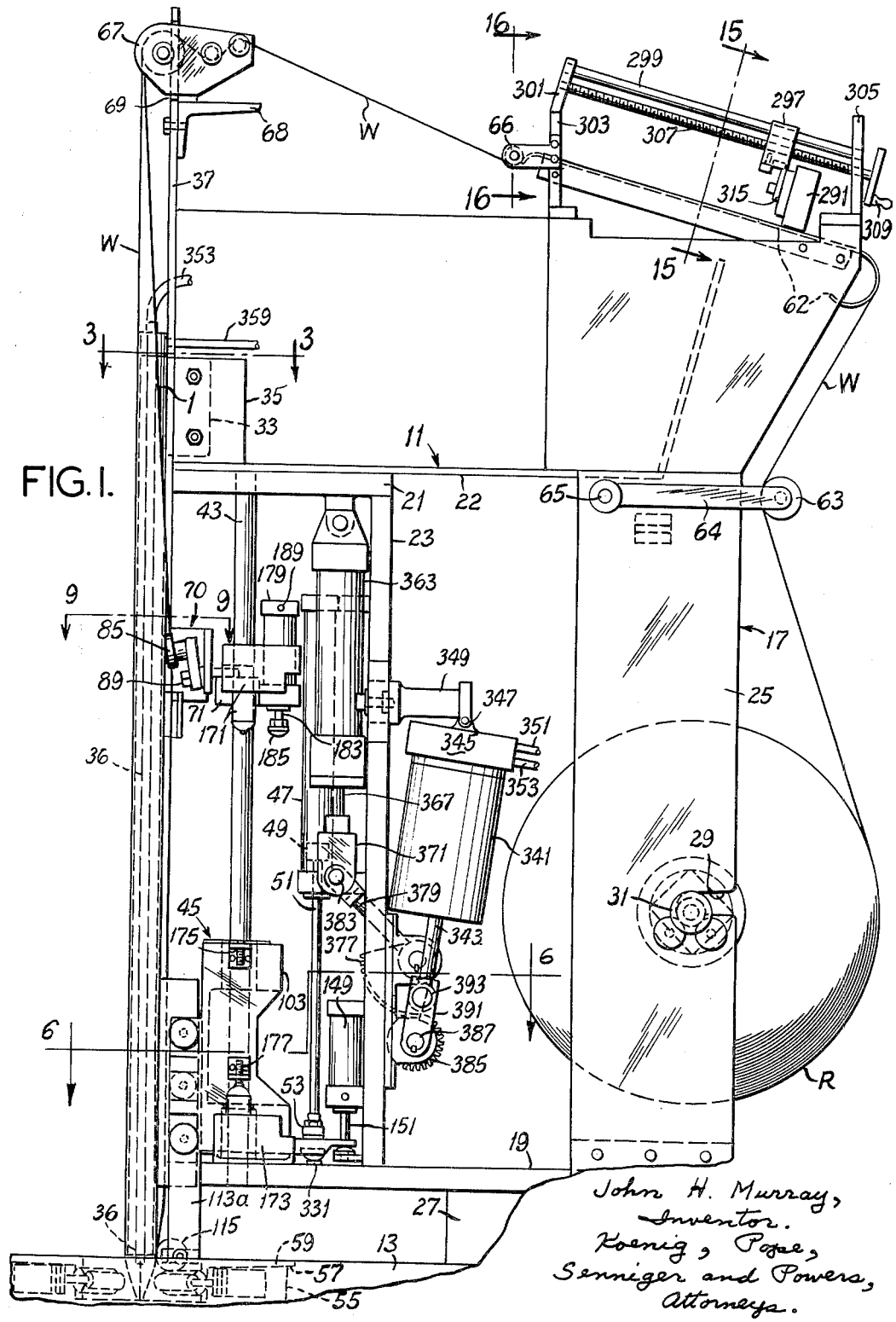

Dec. 7, 1965    J. H. MURRAY    3,221,469
METHOD AND APPARATUS FOR FORMING TETRAHEDRON SHAPED PACKAGES
Filed March 21, 1962    10 Sheets-Sheet 1

John H. Murray,
Inventor.
Koenig, Pope,
Senniger and Powers,
Attorneys.

Dec. 7, 1965   J. H. MURRAY   3,221,469
METHOD AND APPARATUS FOR FORMING TETRAHEDRON SHAPED PACKAGES
Filed March 21, 1962   10 Sheets-Sheet 2
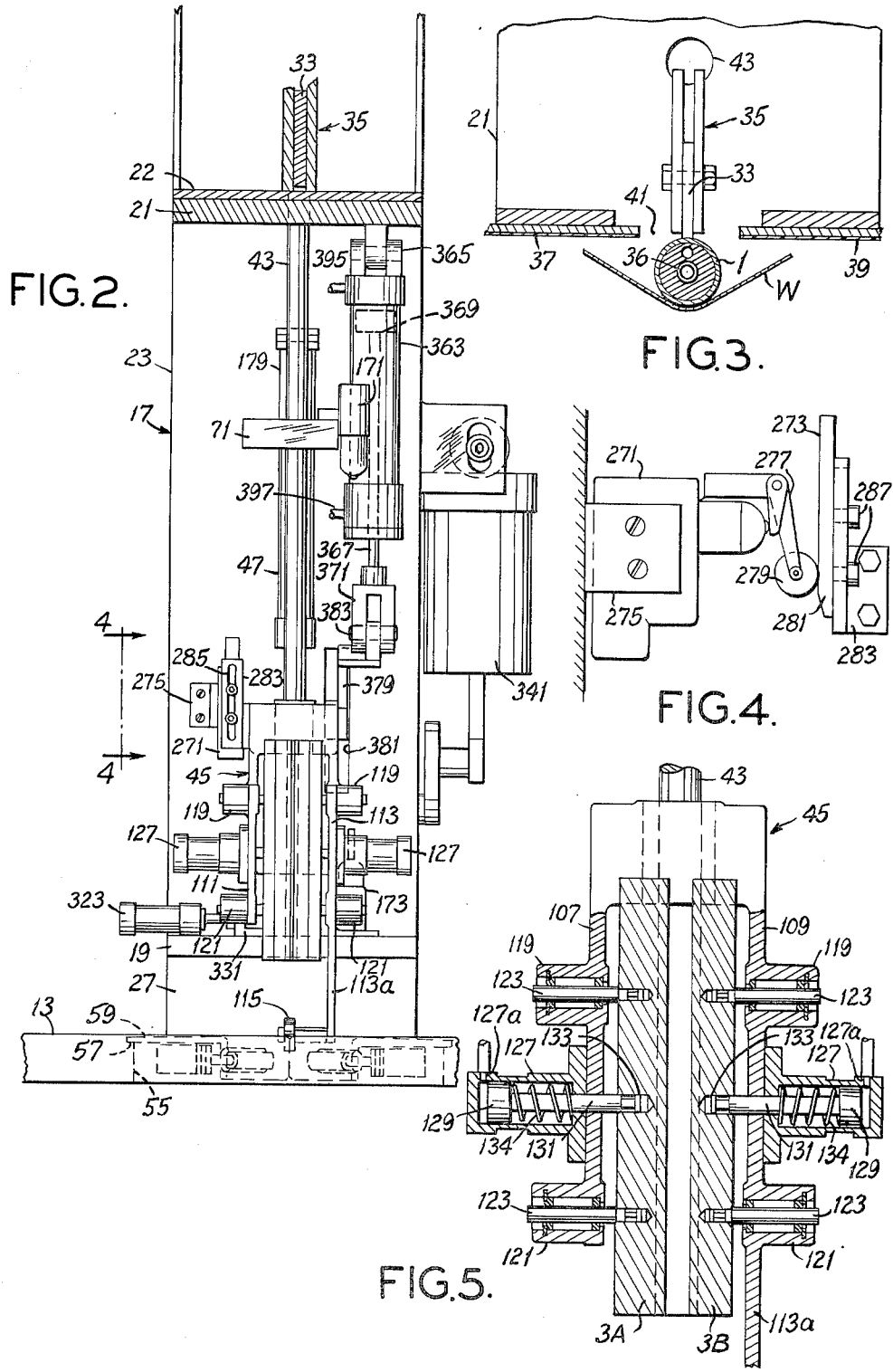

Dec. 7, 1965  J. H. MURRAY  3,221,469
METHOD AND APPARATUS FOR FORMING TETRAHEDRON SHAPED PACKAGES
Filed March 21, 1962  10 Sheets-Sheet 4

Dec. 7, 1965  J. H. MURRAY  3,221,469
METHOD AND APPARATUS FOR FORMING TETRAHEDRON SHAPED PACKAGES
Filed March 21, 1962 10 Sheets-Sheet 5
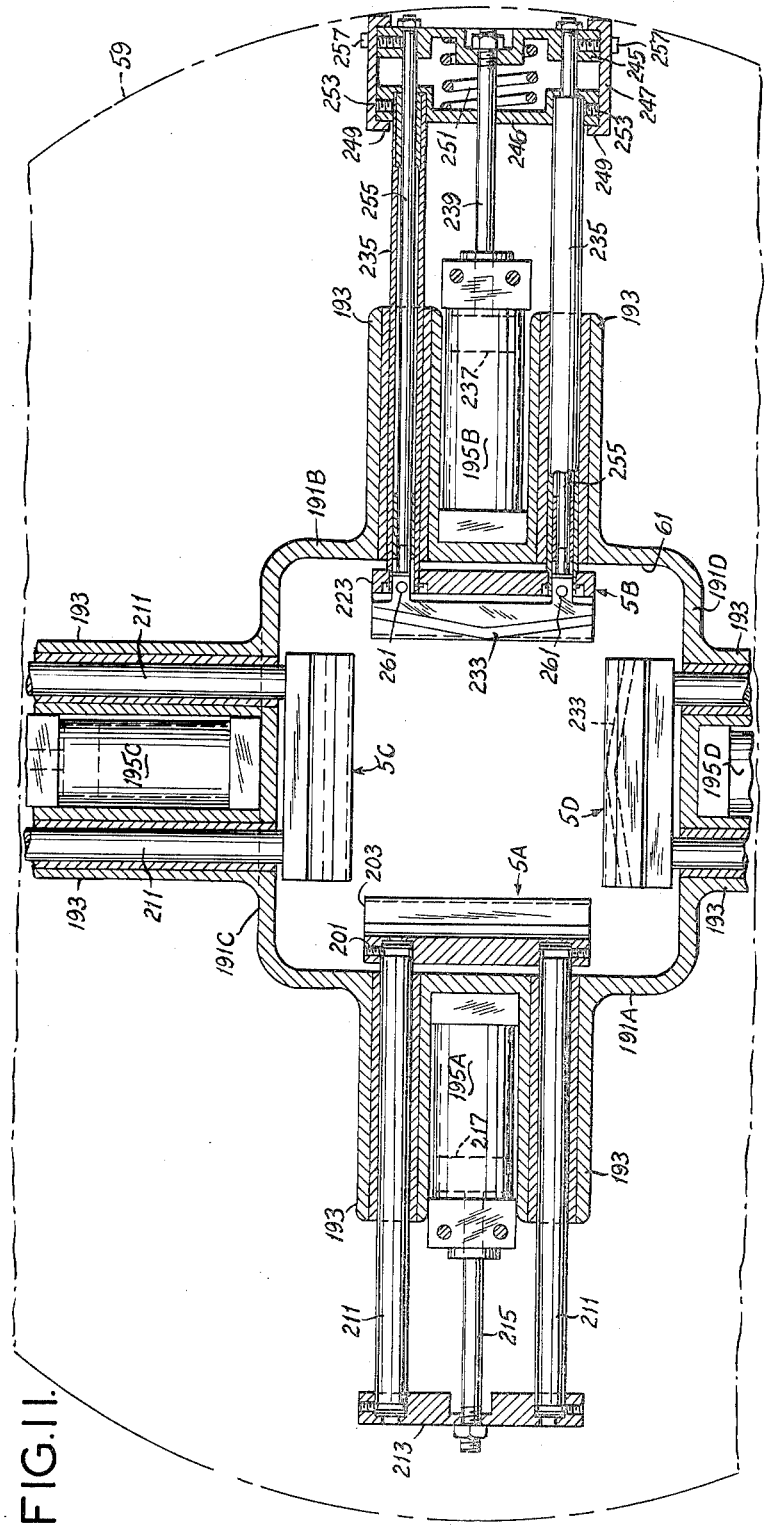
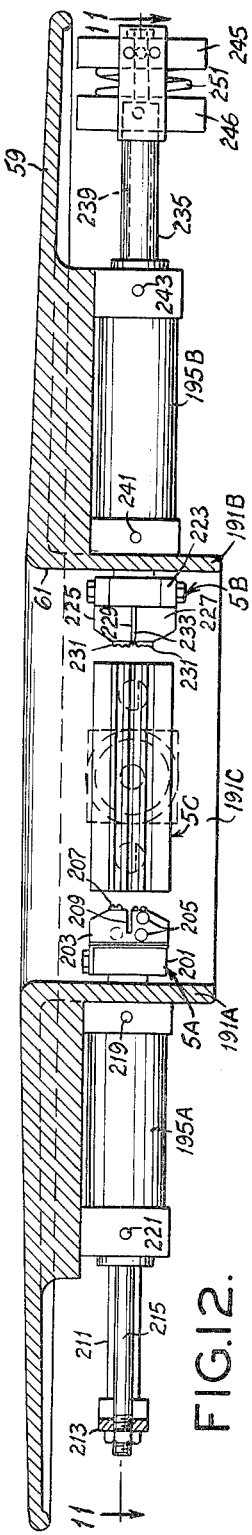

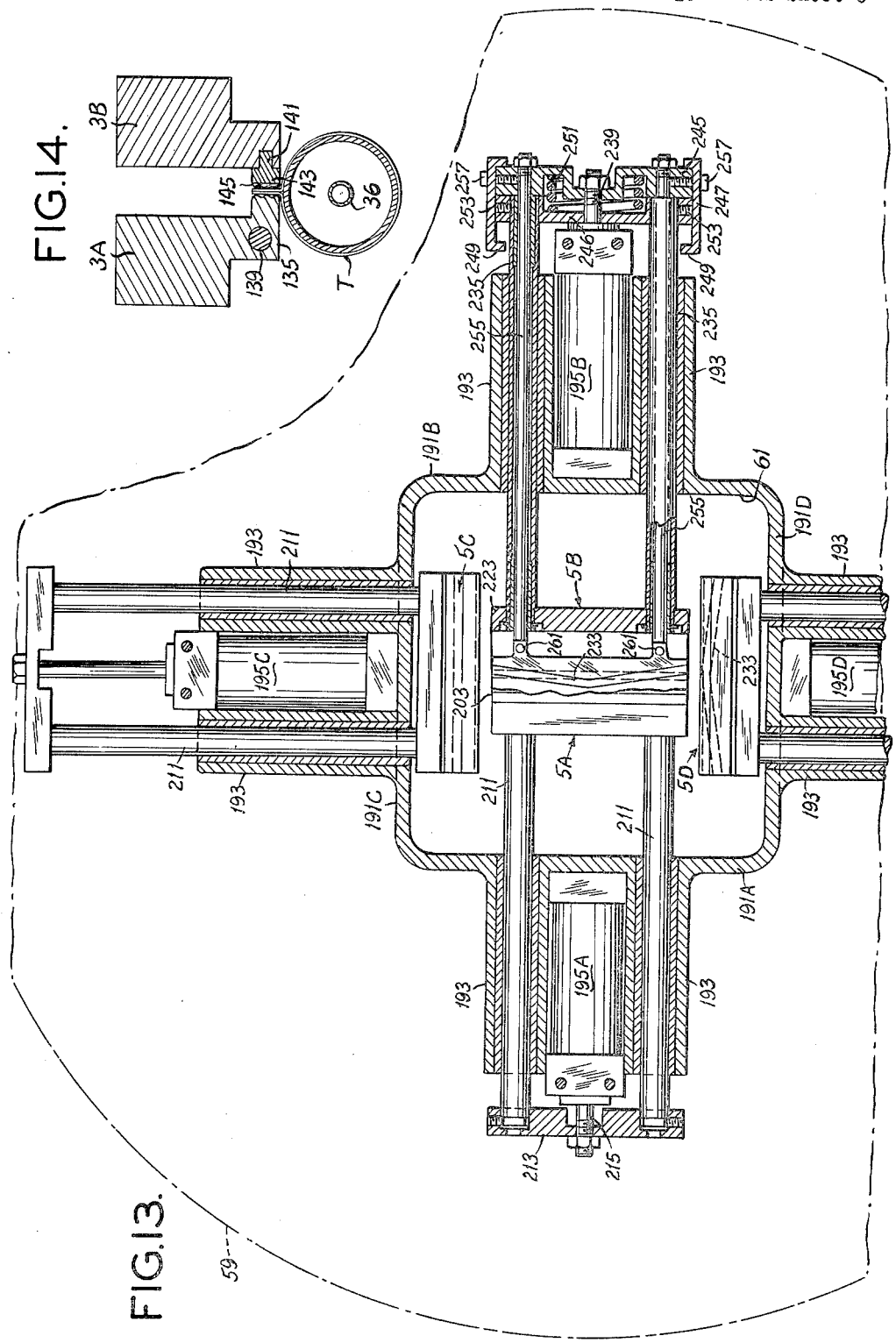

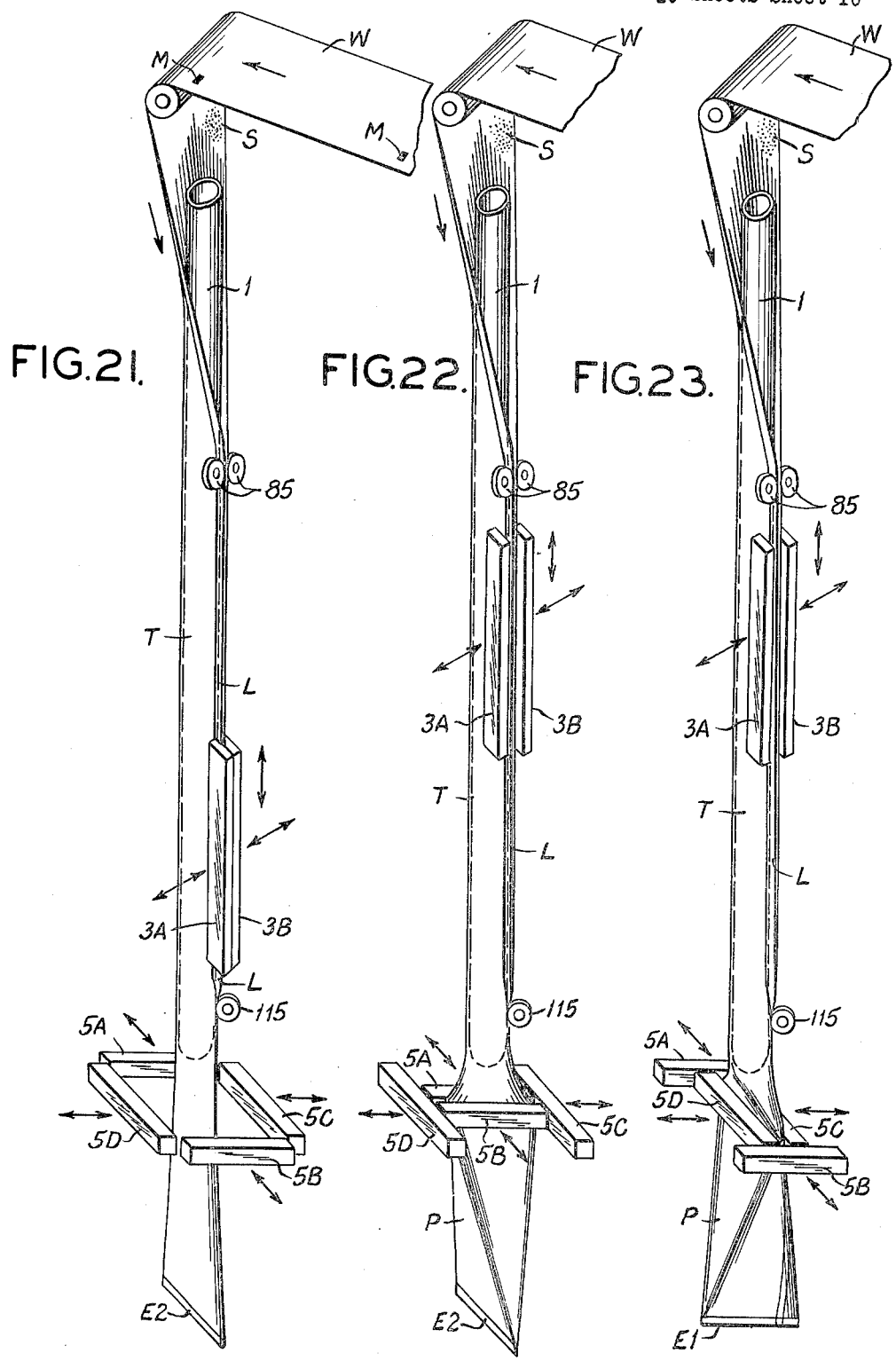

United States Patent Office 3,221,469
Patented Dec. 7, 1965

3,221,469
METHOD AND APPARATUS FOR FORMING TETRAHEDRON SHAPED PACKAGES
John H. Murray, Norwood, Mass., assignor to Packaging Frontiers, Inc., Waltham, Mass., a corporation of Delaware
Filed Mar. 21, 1962, Ser. No. 181,403
22 Claims. (Cl. 53—28)

This invention relates to packaging, and more particularly to an apparatus and method for forming, filling and sealing packages.

The invention is particularly concerned with an apparatus and method for forming, filling and sealing tetrahedron-shaped packages, the packages being formed from a continuous web of flexible packaging material, but it will be understood that certain principles of the invention may also be applicable to the production of so-called flat packs, as well as applicable to the production of tetrahedron-shaped packages. By a tetrahedron-shaped package is meant a package which essentially comprises a length of tubing having a transverse seal at one end in a first plane and a transverse seal at its other end in a second plane at such an angle to the first transverse seal (usually at an angle of approximately 90° to the first transversely seal), that the package has four triangular sides, two of which have the first transverse seal as their base and the other two of which have the second transverse seal as their base. This may also be referred to as a tetrahedral package, and is distinguished from the so-called flat pack, which also essentially comprises a length of tubing of flexible packaging material having transverse end seals, but as to which the transverse end seals are in the same plane. It will be appreciated that one of the primary advantages of the tetrahedron-shaped package over the flat pack is that it has a substantially greater capacity for a given area of packaging material than a flat pack. Thus, for packaging a given quantity of product, substantially less packaging material is used to make a tetrahedron-shaped package than to make a flat pack.

One technique for production of so-called formed-filled-sealed packages, whether tetrahedron-shaped packages or flat packs, generally involves the forming of web material into a tube and making package-end-forming seals across the tube at package length intervals. Generally, this has been accomplished by forming a web into a tube around a vertical tubular mandrel, drawing down a package length increment of the tube off the lower end of the mandrel and making a package-end-forming seal during the drawing down of the tube by downward movement of a sealer for making the package-end-forming seal. The web is formed into a tube by wrapping it around the mandrel in such manner as to bring its margins into engagement, and the margins are sealed together to form a longitudinal seam completing the tube.

For utilizing flexible packaging material which, for economy, is heat-sealable only on one side, it is desirable that the longitudinal seam be formed by wrapping the web around the mandrel with its heat-sealable side on the inside and with its margins in inside-face-to-inside-face relation, and heat-sealing them together in this relation.

Among the several objects of this invention may be noted the provision of an improved method of making packages of the class described, and improved apparatus for carrying out the method, which enables operation without any movement of package-end-forming sealers other than in-and-out movement, thereby simplifying the construction and the operation of the apparatus; the provision of a method and apparatus such as described which takes advantage of the formation of the inside-face-to-inside-face longitudinal seam for enabling such operation; the provision of apparatus such as described which may be readily set up for making packages of different sizes; and the provision of apparatus such as described which is efficient and reliable in operation. Other objects and features will be in part apparent and in part pointed out hereinafter.

The invention accordingly comprises the constructions and methods hereinafter described, the scope of the invention being indicated in the following claims.

Figure 6:
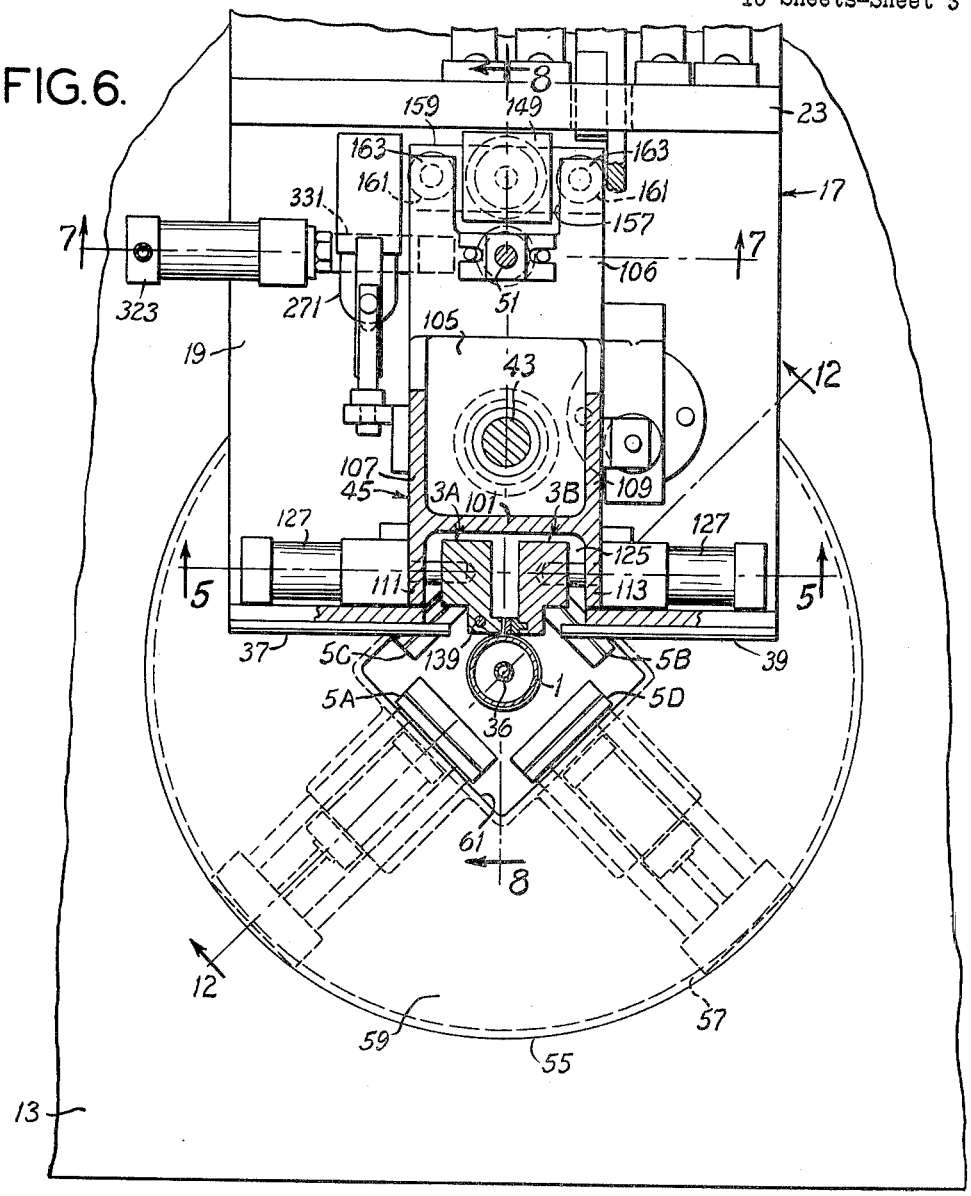
Figure 7:
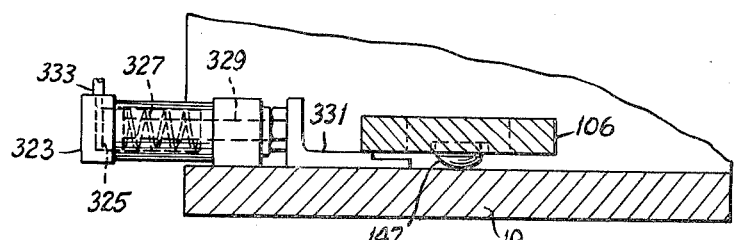
Figure 8:
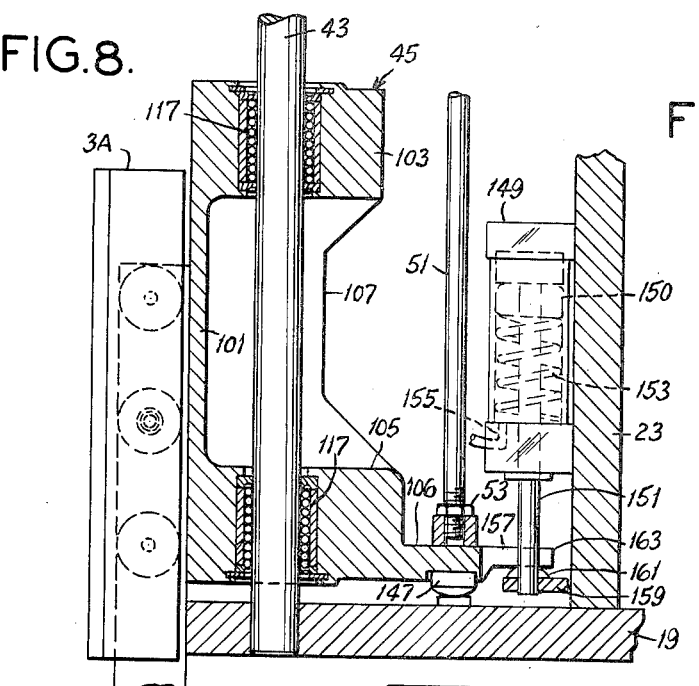
Figure 10:
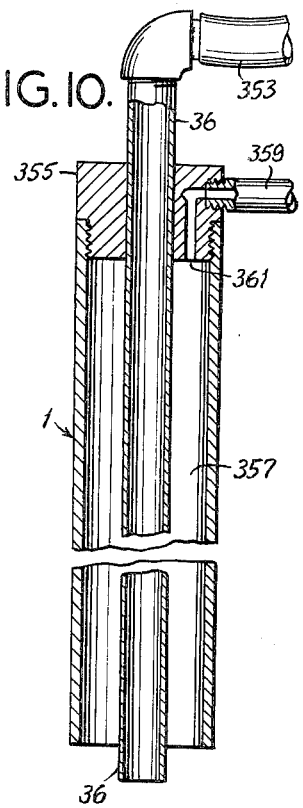
Figure 9:
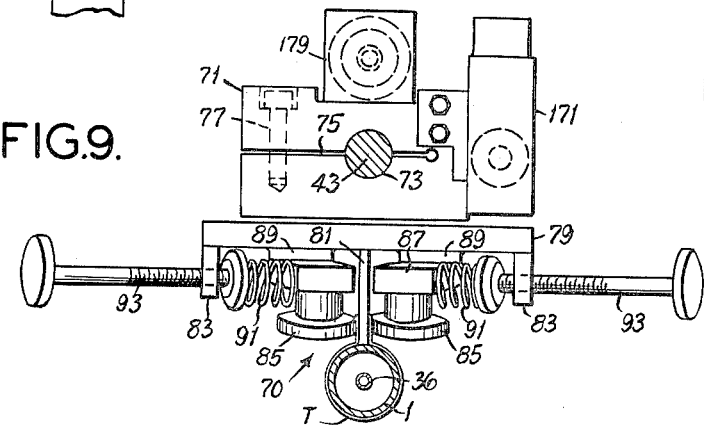
Figure 9A:
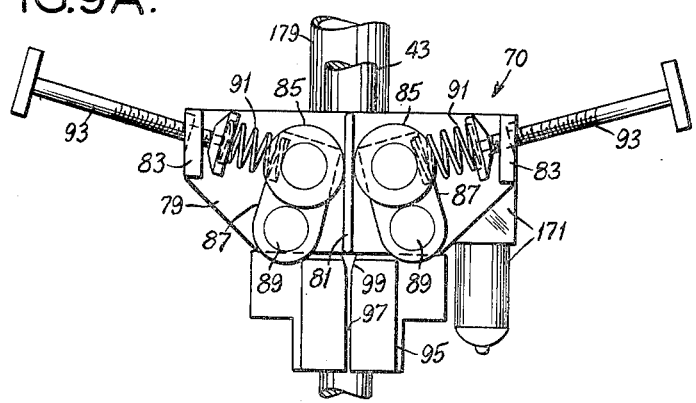
Figure 15:
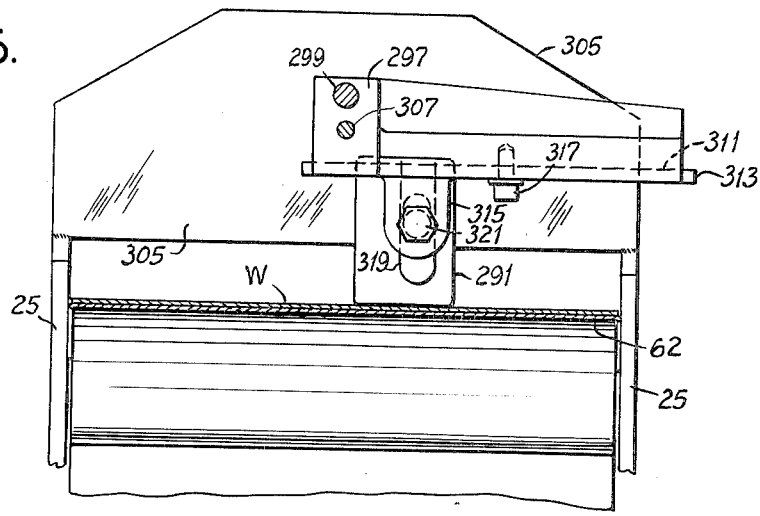
Figure 16:
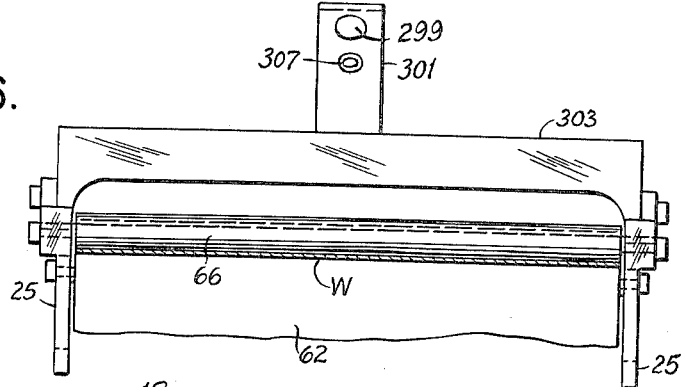
Figure 17:
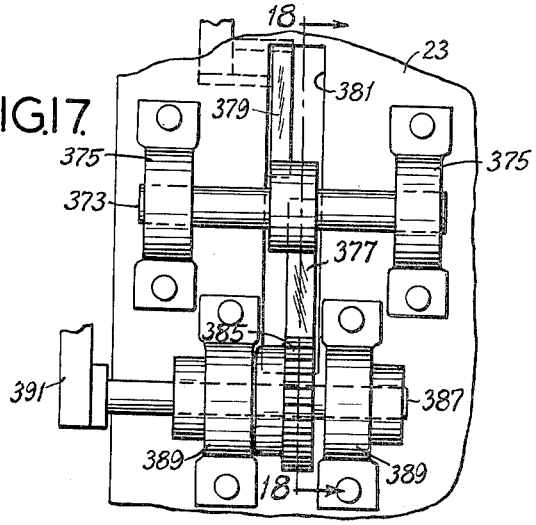
Figure 18:
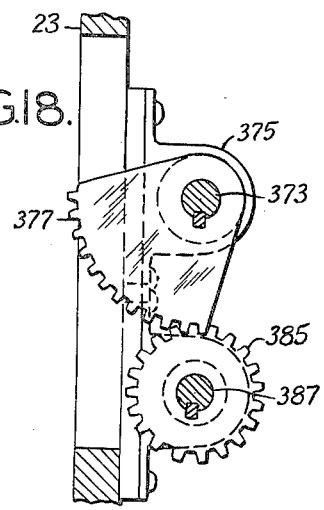
Figure 19:
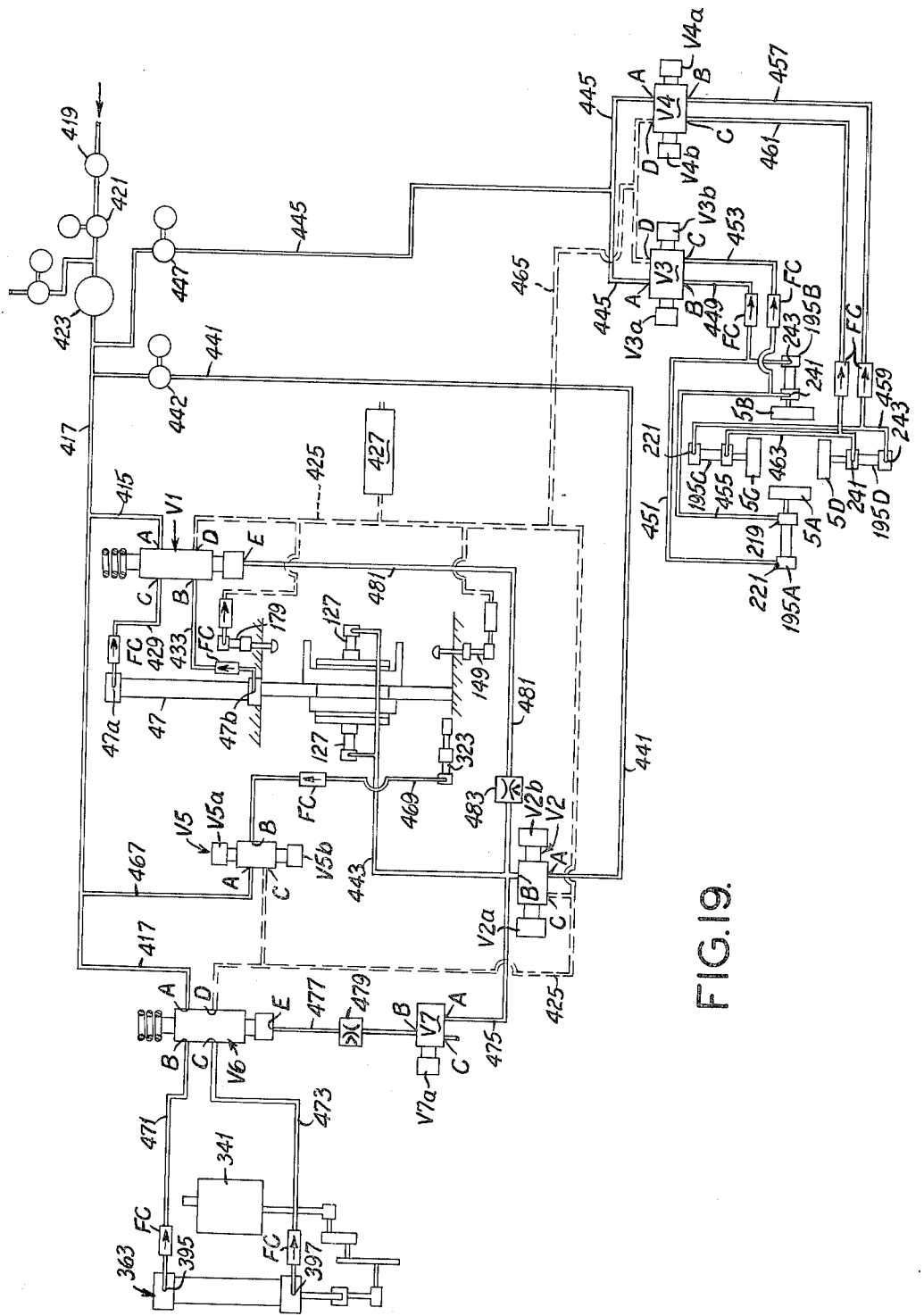
Figure 20:
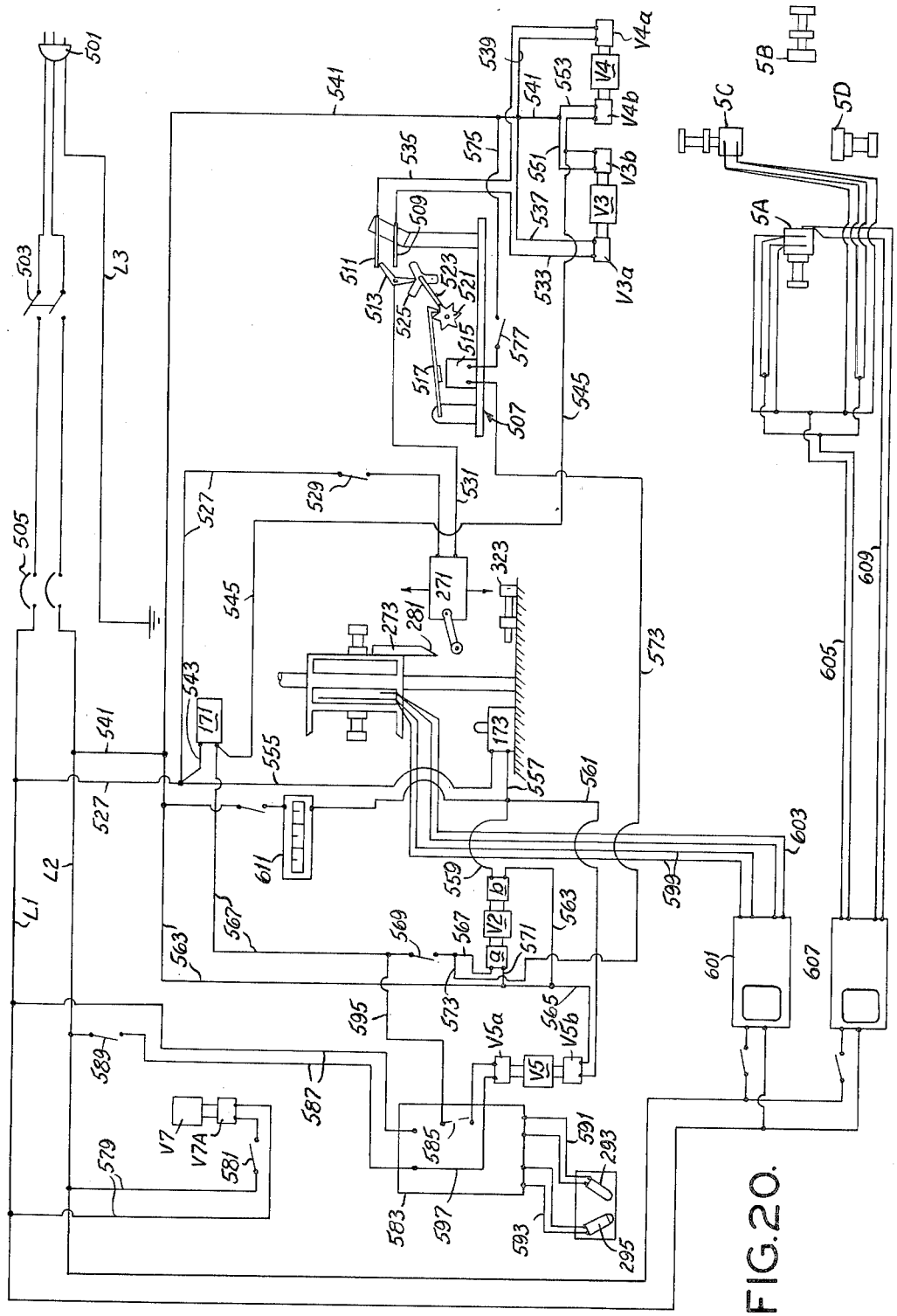

In the accompanying drawings, in which one of various possible embodiments of the invention is illustrated, FIG. 1 is a side elevation of an apparatus constructed in accordance with this invention with parts broken away;
FIG. 2 is a front elevation of the apparatus with certain parts removed and other parts shown in section;
FIG. 3 is an enlarged horizontal section taken on line 3—3 of FIG. 1;
FIG. 4 is an enlarged view taken on line 4—4 of FIG. 2;
FIG. 5 is a vertical section taken on line 5—5 of FIG. 6;
FIG. 6 is an enlarged horizontal section taken on line 6—6 of FIG. 1;
FIG. 7 is a vertical section taken on line 7—7 of FIG. 6;
FIG. 8 is an enlarged vertical section taken on line 8—8 of FIG. 6 with certain parts removed;
FIG. 9 is an enlarged horizontal section taken on line 9—9 of FIG. 1;
FIG. 9A is a front elevation of FIG. 9;
FIG. 10 is a vertical section illustrating a mandrel and filler pipe;
FIG. 11 is a horizontal section taken on line 11—11 of FIG. 12;
FIG. 12 is an enlarged vertical section taken on line 12—12 of FIG. 6;
FIG. 13 is a view similar to FIG. 11 showing a moved position of parts;
FIG. 14 is an enlarged horizontal section showing the mandrel and certain side seam sealers;
FIG. 15 is an enlarged section taken on line 15—15 of FIG. 1;
FIG. 16 is an enlarged section taken on line 16—16 of FIG. 1;
FIG. 17 is an enlarged fragmentary plan of certain gearing;
FIG. 18 is a vertical section taken on line 18—18 of FIG. 17;
FIG. 19 is a diagram showing the pneumatic system of the apparatus;
FIG. 20 is a diagram showing the electrical system of the apparatus; and
FIGS. 21, 22 and 23 are diagrammatic perspectives illustrating steps in the method of the invention for forming, filling and sealing tetrahedron-shaped packages.

Corresponding reference characters indicate corresponding parts throughout the several views of the drawings.

Referring to the drawings, FIGS. 21–23 illustrate the basic method of the invention for forming, filling and sealing tetrahedron-shaped packages, and will afford an understanding of the basic operation of the apparatus of the invention to be later described in detail. As shown, a web of flexible packaging material W, which is heat-sealable on one side as indicated at S, is drawn from a web roll R (see FIG. 1), and formed into tubing T around a vertical hollow mandrel 1, with its heat-sealable side S on the inside, and with its side margins brought together in inside-face-to-inside-face relation and projecting outward. The flexible packaging material may comprise, for example, laminated layers of paper and metal foil with a coating of thermoplastic material, such as polyethylene, on the paper layer.

The tubing T is intermittently fed downward off the lower end of the mandrel in package length increments by grasping the outwardly projecting side margins and pulling downward thereon. The grasp on the side margins is taken by a pair of vertically positioned heat-sealing bars 3A and 3B, which apply heat as well as pressure to the side margins as the tubing is fed downward to cause the side margins to become heat-sealed together thereby to form a logitudinal seam L for the tubing. Bars 3A and 3B, which may be referred to as the longitudinal seam sealing bars or side sealers, are adapted to move laterally inward and outward, as well as vertically upward and downward, as indicated by the arrows in FIGS. 21–23. They are brought together to clamp the side margins, then move downward, then open, and return upward to clamp the side margins and initiate downward feed of the tubing through another package length increment. As the side sealers 3A and 3B return upward, the tubing dwells for an interval until the bars reach the top of their stroke and clamp the side margins. As the side sealers 3A and 3B move downward, the longitudinal seam L is folded over on the tubing. Since the side sealers are clamped on the seam L as the tube is fed downward, the tube is maintained against rotation around its axis and the seam L is maintained straight extending lengthwise of the tube.

During each dwell interval between successive downstrokes of the tubing, a transverse package-end-forming seal is made across the tubing below the lower end of the mandrel, successive package-end-forming seals being in vertical planes substantially at right angles to one another. The package-end-forming seals in one such plane are indicated at E1 and the package-end-forming seals in the other such plane are indicated at E2. The right-angle relationship of seals E1 and E2 establishes the tetrahedron shape for the packages, one of which is shown about to separate from the tubing T in each of FIGS. 22 and 23, and designated P. The seals E1 are made by a first pair of heat-sealing heads 5A and 5B (which may be referred to as the first end sealers) operating in a horizontal plane below the lower end of the mandrel, and the seals E2 are made by a second pair of heat-sealing heads 5C and 5D (which may be referred to as the second end sealers) shown as operating in the same horizontal plane as end sealers 5A and 5B, but at right angles to end sealers 5A and 5B.

Production of packages P proceeds by feeding downward a package length increment of tubing T (formed with the inside-face-to-inside-face longitudinal seal L) with all four end sealers 5A, 5B, 5C, 5D open. FIG. 21 shows side sealers 3A and 3B at the lower end of their stroke, having just completed the downward feed of a package length increment of tubing T (and accompanying drawing forward of a package length increment of web W from roll R), with all four end sealers open. Side sealers 3A and 3B are about to open and return upward. End sealers 5A and 5B then move inward toward one another to form a seal E1 during the ensuing dwell of tubing T, as shown in FIG. 22. Then, end sealers 5A and 5B open, and another package length increment of tubing T is fed downward by the side sealers 3A and 3B. A charge of the product with which the packages are to be filled is delivered into the tubing. Then, end sealers 5C and 5D are moved inward toward one another to form a seal E2 at right angles to seal E1 during the ensuing dwell of the tubing, as shown in FIG. 23. End sealers 5C and 5D are then opened, another package length increment of the tubing is fed downward by side sealers 3A and 3B, a charge of the product with which the packages are to be filled is delivered into the tubing, end sealers 5A and 5B are moved inward toward one another to form the next seal E1, and so on. As each package-end-forming seal is formed, the tubing T is cut across on a line located between the upper and lower confines of the seal to segment each package P from the tubing as the formation of the package is completed.

Now referring more particularly to FIGS. 1, 2 and 6, an apparatus constructed in accordance with this invention for carrying out the above described method is shown to comprise a supporting structure designated in its entirety by the reference numeral 11, and comprising a table 13 (table legs being omitted from the drawings because of space limitations), and a superstructure 17 on the table. The superstructure includes a base plate 19, top plates 21 and 22, a transverse vertical plate 23 extending between plates 19 and 21, and a pair of side plates 25. Base plate 19 is supported on a built-up portion 27 of the table at what may be referred to as the rear thereof, and projects forward from built-up portion 27 spaced some distance above the table. Side plates 25 are notched as indicated at 29 for receiving arbor 31 of web roll R.

The hollow mandrel 1 is mounted in vertical position at the front of the superstructure. It comprises a tube having an outside diameter corresponding to the diameter of tubing T into which the web W of flexible packaging material form roll R is to be formed. As will be understood, the width of web W is somewhat greater than the circumference of the mandrel to allow for formation of the inside-face-to-inside-face longitudinal seam L. The mandrel is removably mounted at its upper end on the superstructure. For this purpose, the mandrel has a lug 33 at its upper end which is secured in a bracket 35 mounted on top plate 22 of the superstructure. It extends down from the clamping bracket, being otherwise unsupported. This is to enable web W to be formed into tubing T around the mandrel below the bracket and to enable the tubing to be fed downward off the lower end of the mandrel. The mandrel extends down below base plate 19 of superstructure 17 to a point just above table 13. It is tubular to accommodate a filler pipe 36 for delivery therethrough into the tubing T of the product with which the packages P are to be filled. The superstructure has vertical front plates 37 and 39 which extend laterally outward immediately rearward of the mandrel, with a space between their adjacent edges at the center of the apparatus as indicated at 41. The mandrel is readily removable simply by loosening the clamp of the clamp bracket 35, and other mandrels of different diameter for forming packages of different sizes may be readily substituted therefor.

A post 43 extends vertically between the base plate 19 and the top plate 21 of the superstructure 17 toward the front thereof, and rearward of the space 41 between the adjacent edges of the front plates 37 and 39. Vertically slidable on this post is a carriage 45 which carries the longitudinal seam sealing bars 3A and 3B. Means for vertically reciprocating the carriage 45 and the bars 3A and 3B carried thereby is shown to comprise a vertical air cylinder 47 having a piston 49 slidable therein, and a piston rod 51 extending out of the lower end of the air cylinder to a connection at 53 with the carriage at the lower end of the latter. The air cylinder is mounted on the front of plate 23.

The table 13 has a circular opening 55 therein coaxial with the mandrel 1. This opening is formed with an upwardly facing annular shoulder 57 therearound. A circular plate 59 (see FIGS. 1, 2, 6 and 12) is positioned in opening 55 bearing on this shoulder. Plate 59 has a square central opening 61, and carries the two pairs of end sealers 5A–5B and 5C–5D and the operating mechanism therefor. Sealers 5A and 5B are adapted to occupy retracted or open positions at two opposite sides of square opening 61, and sealers 5C and 5D are adapted to occupy retracted or open positions at the other two opposite sides of opening 61. Sealers 5A and 5B are movable inward from their retracted position, when sealers 5C and 5D are retracted, toward the center of opening 61. Similarly, sealers 5C and 5D are movable inward from their retracted position, when sealers 5A and 5B are retracted, toward the center of the opening 61. Each sealer 5A, 5B, 5C and 5D is operated by an air cylinder, as will be made clear. Circular plate 59 is positioned in opening 55 with the sides of the square opening 61 at a 45° angle in relation to the front and sides of the table 13 (see FIG. 6).

The web W is drawn from roll R around the curved rearward edge of an inclined web guide plate 62 which spans the side plates 25 toward the top of the superstructure 17. In passing from the roll R to the web guide plate it travels around a web tension roll 63 carried by a pair of arms such as indicated at 64 pivoted at 65 on plates 25. The web passes under a guide roll 66 at the forward end of the web guide plate 62, and then forward to a guide roll assembly 67 carried on a bracket 68 at the top of front plates 37 and 39. These plates are notched as indicated at 69 to accommodate the guide roll assembly 67 and the passage of the web. From the guide roll assembly, the web passes downward in front of the upper end portion of mandrel 1, and then is wrapped around the mandrel from front to rear to form it into tubing T, with the side margins of the web brought into inside-face-to-inside-face relation, projecting outward from the tubing T and rearward in relation to the mandrel. This forming of the web into tubing T around the mandrel is effected by tube-forming means, designated in its entirety by reference character 70, which is carried by the post 43.

As shown best in FIGS. 9 and 9A, the tube-forming means 69 comprises a block 71 releasably clamped on post 43 and adapted for vertical adjustment on the post to position it at various elevations on the post. For this purpose, block 71 has a central hole 73 receiving the post, a vertical slit 75 intersecting hole 73, and a clamp screw 77 crossing the slit for clamping the block in adjusted position on the post. Block 71 carries a bracket 79 at the front thereof. Bracket 79 has a forwardly extending central vertical separator plate 81, and forwardly extending ears 83 at its ends. Separator plate 81 on bracket 79 is positioned in the front-to-rear central vertical plane of the mandrel 1, and reaches through the space 41 between front plates 37 and 39 of superstructure 17, its forward edge being contiguous to the mandrel. The side margins of the web W are positioned on opposite sides of the separator plate, and are pressed thereagainst by presser rolls 85. There are two such rolls 85, one at each side of the separator plate, each carried at one end of an arm 87 pivoted at 89 on the bracket 79. Each pivot 89, instead of being horizontal, is angled downward to some extent off horizontal. The axis of each roll 85 is parallel to the axis of the respective pivot, consequently the rolls 85, instead of operating in a vertical plane, are angled off from vertical as appears in FIG. 1. Each roll 85 is biased toward the separator plate by a coil compression spring 91 reacting from an adjusting screw 93 threaded in a respective ear 83 against the respective arm 87.

Initially to thread the web W through the apparatus, the web is pulled from web roll R, brought down in front of the upper end portion of mandrel 1, manually wrapped around the mandrel, and its side margins are positioned on opposite sides of the separator plate 81 to lie between the separator plate and rolls 85 with the edges of the web W in register, or at least substantially in register. Rolls 85 are readily retracted from separator plate 81 for insertion of the side margins of web W between the opposite sides of the separator plate and the rolls. Then, when the resultant tubing T is fed downward, rolls 85, in view of their angled attitude tend to draw the web tightly around the mandrel and keep it tracking properly to tend to prevent the side edges of the web from becoming out of register.

Bracket 79 carries a guide 95 for the side margins of the web directly below the separator plate 81 located toward the forward edge of the separator plate below the rolls 85. This guide has a slot 97 which extends vertically from top to bottom thereof, open at top and bottom and at the front. The side margins of the web passing off the lower edge of the separator plate 81 enter this slot which has a convergent entrance throat 99 at its upper end and is restricted in width therebelow to guide the side margins of the web into inside-face-to-inside-face engagement.

Carriage 45 (see FIGS. 1, 2, 5, 6 and 8) comprises a body cast to provide a vertical carriage front wall 101 and relatively thick top and bottom end heads 103 and 105 projecting rearward at the upper and lower ends of the front wall 1. The bottom head 105 of the carriage has a rearward extension 106 of lesser thickness which reaches back toward vertical plate 23. The carriage also has side walls 107 and 109 extending vertically between the end heads 103 and 105 at the sides of these heads. Side wall 107 (which is the left-hand side wall as viewed in FIGS. 2, 5 and 6) has a forward extension 111 projecting forward beyond the front wall 101, having its lower edge coextensive with the bottom of the bottom head 105 and its upper edge below the top of the upper head 103. Side wall 109 (which is the right-hand side wall as viewed in FIGS. 2, 5 and 6) has a forward extension 113 projecting forward beyond the front wall 101, having its upper edge at the same elevation as the upper edge of side wall extension 111 below the top of the upper head 103, but formed to extend well downward below the bottom head 105. The downward projection of side wall extension 113 is designated 113a, and, at its lower end, it carries a roller 115 in the central front-to-rear vertical plane of the mandrel 1 which is adapted to effect folding over and pressing down of the longitudinal seam L formed by the heat-sealing bars 3A and 3B on the carriage. The upper and lower carriage heads 103 and 105 have holes therein for the post 43, and suitable antifriction bearings such as indicated at 117 are provided in these holes to mount the carriage for free guided vertical sliding motion on the post.

Each side wall extension 111 and 113 has an upper boss 119 and a lower boss 121 extending laterally outward therefrom. Horizontally slidable in each boss is a rod 123. Heat-sealing bar 3A is secured on the inner ends of the two rods 123 which are slidable in the bosses on the left-hand side wall extension 111, and heat-sealing bar 3B is secured on the inner ends of the two rods 123 which are slidable in the bosses on the right end side wall extension. Bars 3A and 3B thus extend vertically within the recess 125 defined by front wall 101 of carriage 45 and side wall extensions 111 and 113 at opposite sides of this recess and are movable laterally with respect to the carriage toward and away from one another. The length of the bars 3A and 3B is somewhat greater than the length of the longest package which the apparatus is to produce, i.e., somewhat greater than the maximum stroke of carriage 45. Means for moving each bar laterally in and out is shown to comprise an air cylinder 127 mounted on the outside of the respective carriage side wall extension 111 or 113 having a piston 129 slidable therein and a piston rod 131 extending from the piston through a hole in the respective side wall extension to a connection at 133 with the respective bar. Each of cylinders 127 has a port 127a at its outer end for admission of compressed air to move the respective bar 3A or 3B inward, and a return spring 134.

Bar 3A, as shown, is an elongate metal bar having a seam-clamping jaw 135 (see FIGURE 14) extending the full length (or height) of bar 3A projecting laterally therefrom toward bar 3B at the front. This jaw may be longitudinally grooved on its seam-engaging face, if desired. Bar 3A has a recess containing an electrical resistance heating element 139 for heating it to a temperature for effecting inside-face-to-inside-face heat-sealing of the side margins of web W. Bar 3B, as shown, is an elongate metal bar having a longitudinal slot 141 toward the front in the side thereof opposed to bar 3A receiving a removable and replaceable elongate T-section seam-clamping jaw 143 opposed to jaw 135. Jaw 143 extends the full length (or height) of bar 3B, and may have a grooved resilient facing 145 (of rubber or the like) adapted to mate with jaw 135.

Air cylinder 47 for vertically reciprocating the carriage 45 is a double-acting cylinder capable of a stroke at least somewhat greater than the length of the longest package which the apparatus is to produce. Connection 53 between piston rod 51 of this cylinder and the carriage is made to rearward extension 106 of the bottom head 105 of carriage 45 somewhat forward of the rearward end of extension 106. The latter has a bumper button 147 on the bottom in line with piston rod 51. A dashpot cylinder 149, which may be referred to as a cushion cylinder, is mounted in vertical position at the front of vertical plate 23 in the central front-to-rear vertical plane of the apparatus (the plane of mandrel 1, guide post 43, and cylinder 47). This has a piston 150 slidable therein (see FIGURE 8) and a piston rod 151 extending downward out of its lower end. A spring 153 biases the piston and piston rod upward, and the cylinder has a port 155 at its lower end for exhaust and return of air. Piston rod 151 extends down through a notch 157 in the rearward end of extension 106 and carries a crossbar 159 at its lower end below extension 106. Notch 157 is wider than cushion cylinder 149 so that extension 106 may clear cylinder 149. Crossbar 159 has bumper buttons 161 at its ends engageable by the rear end portions 163 of extension 106 on opposite sides of notch 157.

Crossbar 159 is normally held up in a raised position by spring 153. When carriage 45 moves downward, rear end portions 163 of extension 106 engage buttons 161 on crossbar 159 before the carriage reaches the lower end of its stroke. Piston 150, piston rod 151 and crossbar 159 then yield downward as the carriage completes its downward stroke, and this cushions the carriage toward the end of its downstroke to avoid excessive impact at the lower end of its stroke. When the carriage returns upward, spring 153 returns piston 150, piston rod 151 and crossbar 159 upward to their raised retracted position.

Reversal of movement of the carriage 45 at the end of its stroke is controlled by upper and lower limit switches 171 and 173. The upper limit switch 171 is mounted on block 71, and is thereby adjustable up and down on post 43 to vary the rise of the carriage, hence to vary the length of its stroke. The lower limit switch is mounted on the superstructure base plate 19. The upper limit switch is engageable by an upper switch actuator 175 on the carriage and the lower limit switch is engageable by a lower switch actuator 177 on the carriage.

A cushion cylinder 179 similar to cushion cylinder 149 is mounted on block 71 for cushioning the impact of the carriage at the upper end of its stroke. It has a piston (not shown) slidable therein and a piston rod 183 extending downward out of its lower end carrying a bumper button 185 for engagement by the upper carriage head 103. The piston in cylinder 179 is biased downward by a spring (not shown), and cylinder 179 has a port 189 at its upper end for exhaust and entry of air.

Referring now more particularly to FIGS. 11–13, plate 59 is shown to have two downwardly extending vertical flanges 191A and 191B at two opposite sides of the square opening 61 therein, and two downwardly extending vertical flanges 191C and 191D at the other two opposite sides of opening 60. These flanges completely surround the opening to form, in effect, an open square formation under plate 59. Each of flanges 191A, B, C and D has a pair of elongate tubular bosses 193 extending horizontally outward therefrom with a space between these bosses. Four air cylinders 195A, 195B, 195C and 195D extend horizontally outward from the respective flanges 191A, B, C, D for operating the respective heat-sealing heads 5A, B, C, D. Each of these cylinders is located in the space between the respective pair of bosses 193, and has its inner end secured to the respective flange 191A, B, C, D. FIGS. 11–13 show the construction of heads 5A and 5B and the operating mechanism therefor. Head 5C is identical to head 5A and its operating mechanism is identical to that of head 5A, and head 5D is identical to head 5B and its operating mechanism is identical to that of head 5B. Consequently, a description of heads 5A and 5B and their operating mechanism will suffice to illustrate the construction of heads 5C and 5D and their operating mechanism.

Head 5A is a heated head (as is head 5C). Head 5B is not directly heated, but has cutting means incorporated therein as will be made clear. Head 5A comprises a back plate 201 having an elongate sealing jaw 203 thereon. This jaw carries electrical resistance heater elements 205 pocketed in recesses therein. It extends horizontally on plate 201, its length being sufficient to form transverse seals across tubing T of maximum diameter to be handled, and may have grooves such as indicated at 207 in its tube-engaging face. Additionally, it has a central horizontal slot 209 extending back from its tube-engaging face. Rods 211 extend outward from head 5A through the pair of tubular bosses 193 which extend outward from flange 191A. At their outer ends, rods 211 are secured to a yoke 213 on the outer end of piston rod 215 extending out of the outer end of air cylinder 195A from a piston 217 in this cylinder. Cylinder 195A is a double-acting cylinder having ports 219 and 221 at its inner and outer ends. On admitting compressed air to the inner end of the cylinder through port 219, and venting air from the outer end of the cylinder via port 221, the head 5A is moved outward to the retracted or "open" position in which it appears in FIG. 11. On admitting compressed air to the outer end of the cylinder via port 221, and venting air from the inner end of the cylinder via port 219, head 5A is moved inward (see FIG. 13).

Head 5B comprises a back plate 223 with upper and lower jaw members 225 and 227 thereon spaced apart to provide a horizontal slot 229 therebetween. Jaw members 225 and 227 have grooved resilient facings such as indicated at 231 (made of rubber, for example) adapted to mate with jaw 203 of head 5A. Slot 229 has a cutter blade 233 slidable therein. Tubular rods 235 extend outward from head 5B through the pair of tubular bosses 193 which extend outward from flange 191B. Air cylinder 195B is a double-acting cylinder having a piston 237 thereon, a piston rod 239 extending from the piston out of the outer end of the cylinder, and ports 241 and 243 at its inner and outer ends. Piston rod 239 has a yoke 245 fixed on its outer end. A slider 246 is slidably associated with the yoke 245, the latter having side arms 247 extending in the direction toward flange 191B with inwardly extending fingers 249 at the ends of the arms limiting the separation of the slider and the yoke. Spring means 251 interposed between the slider and the yoke biases the slider inward relative to the yoke. At their outer ends, tubular rods 235 are secured to the slider as indicated at 253. Cutter blade operating rods 255 extending slidably through rods 235 extend out of the outer ends of rods 235 and have their outer ends secured to the yoke as indicated at 257. Rods 255 extend inward out of the inner ends of tubular rods 235 into recesses in head 5A, and have their inner ends secured to cutter blade 233 as indicated at 261.

The above-described operating mechanism for head 5B and blade 221 is such that on admitting compressed air to the inner end of cylinder 195B via port 241, and venting air from the outer end of the cylinder via port 243, the piston 237, piston rod 239 and yoke 245 are moved outward to the retracted or "open" position in which they appear in FIGS. 11 and 12. Head 5B assumes the retracted or open position in which it appears in FIGS. 11 and 12, and cutter blade 233 assumes the retracted position completely withdrawn into slot 229 in which it appears in FIGS. 11 and 12. Slider 246 assumes the position shown in FIG. 11 engaging the fingers 249 at the ends of arms 247 of the yoke 245. On admitting compressed air to the outer end of cylinder 195B via port 243, and venting air from the inner end of the cylinder 195B via port 241, the piston 237, piston rod 239, yoke 245, slider 246, rods 235, rods 255 and head 5B move inward, without relative motion between any of these parts so that blade 233 remains retracted, until jaw members 225 and 227 on head 5B come into clamping engagement with the tubing, and then head 5B stops by reason of head 5A having also moved inward into engagement with the tubing. The piston 237, piston rod 239 and yoke 245 then continue to move inward for a blade-operating distance, compressing spring 251 against the arrested slider 246, and this drives rods 255 and the blade 233 inward to cut through the relatively wide heat-sealed seam formed as a result of the pressure applied to the tubing by the heads 5A and 5B and the heat applied by head 5A. The blade cuts through the seam into the slot 209 in head 5A along a horizontal line midway between the upper and lower edges of the seal.

The timing of the operation of the sealing heads 5A–D is controlled by a normally open switch 271 actuated by a cam 273 on carriage 45. Switch 271 is carried by a bracket 275 mounted on the front of plate 23, and has a pivoted operating arm 277 carrying a cam follower roll 279. Cam 273 comprises a flat bar having a tapered lower end 281 mounted for vertical adjustment relative to the carriage 45 on a bracket 283 on the carriage. For purposes of this adjustment, bracket 283 has a vertical slot 285 receiving screws 287 for attaching the cam 273 to the bracket. The arrangement is such that, at a predetermined point in the downstroke of the carriage 45, the tapered lower end 281 of the cam engages the follower roll 279, and cams arm 277 to actuate the switch 271, cam 273 continuing to hold the switch in "on" position as the carriage completes its downward stroke.

The web W of flexible packaging material will usually have printed matter thereon (on its outside face), and usually this will comprise individual printed zones recurring at package length intervals along the length of the web, with spaces between zones where the end seals E1 and E2 are to be made. Each zone will bear the same printed matter, such as brand names, product identification, instructions, etc., and it is important that it be maintained as regards the web feed and the formation of the end seals E1 and E2 so that the latter are always made in the spaces between printed zones, rather than cutting across these zones. For this purpose, the web W is shown in FIG. 21 as having registration control marks M thereon recurring at package length intervals. Means for scanning these marks to determine their position relative to the end sealers 5A–D is provided, comprising a housing 291 (see FIGS. 1 and 15) containing a lamp for directing a beam of light on the web and a photocell to which the beam is reflected off the web, reflection being nullified by the marks M. The lamp and photocell are shown in FIG. 20, where they are respectively designated 293 and 295.

For properly positioning the lamp and photocell relative to the web, housing 291 is mounted for lateral and longitudinal adjustment relative to the web. Adjusting mechanism for this purpose is shown to comprise a body 297 slidable on a rod 299 extending parallel to web guide plate 62 in front-to-rear direction above the latter. Rod 299 has its forward end mounted in a lug 301 on a bridge member 303 (see FIGS. 1 and 16) which spans the side plates 25 (and which is formed to provide for passage of the web W), and its rear end mounted in a rear plate 305 (see FIGS. 1 and 15) which spans the side plates 25. A screw-threaded shaft 307 is journalled in lug 301 and plate 305 extending underneath and parallel to rod 299. Body 297 has a tapped hole receiving this screw shaft. The latter has a handwheel 309 on its rear end for turning it in one direction or the other to move body 297 forward or rearward. The body 297 has a bottom groove 311 slidably receiving a cross-slide 313 carrying a bracket 315 for mounting housing 291. The cross-slide is clamped in groove 311 by a clamp screw and washer as indicated at 317. Housing 291 is adjustable up and down on bracket 315, the bracket having a slot 319 receiving a housing clamp screw 321 for this purpose. The arrangement is such that by turning handwheel 309, housing 291 may be adjusted longitudinally relative to guide plate 62; by adjusting cross-slide 313, housing 291 may be laterally adjusted; and housing 291 may also be adjusted up or down relative to guide plate 62.

An air cylinder 323 is mounted in horizontal position on plate 19 at the left thereof as viewed from the front of the apparatus extending transversely with respect to plate 19 and in the vertical transverse plane of the piston rod 51 and bumper button 147. A piston 325 (see FIG. 7) is slidable in this cylinder and is biased toward the left end of the cylinder as viewed in FIG. 7 by a spring 327. A piston rod 329 extends from the piston through the right end of the cylinder. A carriage stop 331 is secured to the outer (right) end of piston rod 329. Spring 327 normally biases piston 325, rod 329 and stop 331 to the retracted position in which it is shown in solid lines in FIG. 7 in which the right end of the stop is clear of bumper button 147 on the carriage (to the left thereof). On admitting compressed air to the left end of cylinder 323 via a port 333, stop 331 is moved toward the right to bring its right end under button 147 for shortening the stroke of carriage 45. In this regard, the block 71 is adjusted on post 43 to position the upper limit switch 171 so that the normal stroke of the carriage (as determined by switches 171 and 173) is slightly greater than the minimum desired package length. For example, assuming that a 6 inch minimum package length is desired, the block 71 is adjusted so that the normal stroke of the carriage 45 will be 6.030 inches. Housing 291 is positioned so that a mark M on web W initially trails the photocell in the housing a short distance (0.125 inch, for example). As packages are formed, each successive mark M will creep forward in relation to the photocell, and ultimately a mark will interrupt the reflection of light to the photocell. This may occur, for example, every five packages. Then, on the next upstroke of the carriage 45 and closure of limit switch 171, the photocell will trigger operation of cylinder 323 to push stop 331 to the right to bring its right end under the button 147. This shortens the next downstroke of the carriage by the thickness of the end portion of the stop (which may be 0.125 inch, for example) and this brings a mark M back to the initial position trailing the photocell, thereby to effect a correction to insure proper registration of seals E1 and E2 with the printing.

As previously mentioned, after each successive package length increment of tubing T has been fed downward, and before one or the other pairs of end sealers 5A–5B or 5C–D operates to form the next end seal E1 or E2, as the case may be, a charge of the product with which the packages are to be filled is delivered to the lower end of the tubing (which is sealed off by the previously formed end seal E2 or E1, as the case may be). As illustrated herein, the product may be a liquid or semiliquid product, and for effecting the intermittent delivery of measured charges thereof, there is provided a filler pump 341 (see FIGS. 1 and 2) which may be a standard filler pump constituted by a cylinder having a piston slidable therein, with a piston rod 343 extending from one end of the cylinder (its lower end as shown). The cylinder has a head 345 at its other end (its upper end) which is pivotally mounted as indicated at 347 on a bracket 349 extending rearward from plate 23. Head 345 has a check-valved inlet to which is connected a flexible supply line 351 leading from a source of supply (not shown) of the product with which the packages are to be filled, and an outlet. It also has a check-valved outlet to which is connected a delivery line 353 leading to the upper end of filler pipe 36.

The latter is fixed in a cap 355 threaded in the upper end of the mandrel 1, and extends down through the mandrel, generally coaxial with the mandrel, to a point slightly below the lower end of the mandrel. The filler pipe is of smaller external diameter than the internal diameter of the mandrel so that there is an annular space 357 around the pipe. Compressed air is supplied to this space via an air line 359 passage 361 in the cap 355.

An air cylinder 363 is provided for actuating the filler pump 341. This is a double-acting cylinder, pivoted at its upper end as indicated at 365 on plate 21 in front of plate 23. A piston rod 367 extends out of the lower end of the cylinder from a piston 369 in the cylinder. Rod 367 has a clevis 371 at its lower end. A horizontal shaft 373 journalled in bearings 375 on the back of plate 23 carries a sector gear 377 (see FIGS. 1, 17 and 18). This gear has an arm 379 extending through a slot 381 in plate 23 and pin-connected at 383 in clevis 371. Gear 379 meshes with a pinion 385 secured on a horizontal shaft 387 journalled in bearings 389 on the back of plate 23. Shaft 387 has a crank 391 on its outer end pin-connected at 393 to the lower end of filler pump piston rod 343.

Cylinder 363 has a port 395 at its upper end and a port 397 at its lower end. The arrangement is such that on admission of compressed air through the upper port 395 and venting of air through the lower port 397, piston 369 is driven downward, thereby rotating sector gear 377 and pinion 385 to rotate crank 391 clockwise 90° as viewed in FIG. 1. This pulls piston rod 343 downward to retract the piston of the filler pump 341, thereby drawing a charge of product into the latter. Then, on admission of compressed air through the lower port 397 of cylinder 363 and venting of air through the upper port 395, piston 369 is driven upward and acts through the gear 377, pinion 385 and crank 391 to drive piston rod 343 and the piston of the filler pump upward to deliver a measured charge of product through line 353 and filler pipe 36 to the lower end of tubing T. Suitable provision is made for adjustment of the throw of crank 391 to vary the amount of the charge depending on the size of package. For certain liquid products and sizes of pipe 36, the line 33 and the pipe will remain primed without any special provision for keeping the liquid from running out of the pipe. For other products or pipe sizes, a check valve may be provided at the lower end of the filler pipe to maintain the delivery system primed.

Now referring to FIG. 19 showing the pneumatic system for the apparatus, at V1 is indicated an air-operated four-way valve for controlling the operation of the carriage-reciprocating cylinder 47. At V2 is indicated a solenoid-operated three-way valve for controlling the operation of the cylinders 127 for actuating the side seam sealing bars 3A and 3B. At V3 is indicated a solenoid-operated four-way valve for controlling the operation of cylinders 195A and 195B for actuating the end seal sealing heads 5A and 5B. At V4 is indicated a solenoid-operated four-way valve for controlling the operation of cylinders 195C and 195D for actuating the end seal sealing heads 5C and 5D. At V5 is indicated a solenoid-operated three-way valve for controlling the operation of cylinder 323 for actuating the registration correction stop 331. At V6 is indicated an air-operated four-way valve for controlling operation of the cylinder 363 for actuating the filler pump 341. At V7 is indicated a solenoid-operated three-way valve for controlling operation of valve V6. Valve V2 also controls supply of pilot pressure to valve V1 and supply of pilot pressure to valve V6 via valve V7.

Valve V1 is a conventional air-operated four-way valve, having a valve member therein adapted to be held by a spring in a first position connecting a valve port A to a valve port B and connecting a valve port C to a valve port D, and movable on admission of compressed air through a pilot port E to a second position connecting port A to port C and port B to port D. Port A is a pressure port and has a connection 415 thereto from a compressed air supply line 417. This line has connected therein an air filter 419, a pressure regulator 421 and a lubricator 423. Port D is a vent port and is connected to an air exhaust system generally indicated at 425 and including a muffler 427. A line 429 including a flow control valve FC connects port C and port 47a at the upper end of cylinder 47, and a line 433 including a flow control valve FC connects port B and the port 47b at the lower end of cylinder 47. Valves FC are conventional flow control valves providing for controlled flow in the direction of the arrow and unrestricted flow in the opposite direction.

Valve V2 is a conventional solenoid-operated three-way valve having a valve member therein and two solenoids V2a and V2b for actuating the valve member. On energization of solenoid V2a, the valve member shifts to a first position connecting a valve port A to a valve port B and blocking a valve port C, and on energization of solenoid V2b, the valve V2b, the valve member shifts to a second position connecting port B to port C and blocking port A. Port A is a pressure port and has a connection 441 thereto from the main air supply line 417 downstream from the lubricator 423, this connection including a pressure regulator 442. Port B is connected to side seal cylinders 127 as indicated at 443. Port C is a vent port, connected to exhaust system 425.

Each of valves V3 and V4 is a conventional solenoid-operated four-way valve having a valve member therein and two solenoids for actuating the valve member. The solenoids of valve V3 are designated V3a and V3b; the solenoids of valve V4 are designated V4a and V4b. Each of these valves has ports A, B, C and D. When the a solenoid of either one of these valves is energized, its valve member shifts to connect port A to port B and to connect port C to port D. When the other solenoid is energized, the valve member shifts to connect port A to port C and port B to port D. Ports A of valves V3 and V4 are pressure ports, and have a connection 445 to main supply line 417 downstream from lubricator 423, this connection including a pressure regulator 447. A line 449 including a flow control valve FC connects port B of valve V3 and a common line 451 for ports 221 and 243 at the outer ends of cylinders 195A and 195B. A line 453 including a flow control valve FC connects port C of valve V3 and a common line 455 for ports 219 and 241 at the inner ends of cylinders 195A and 195B. A line 457 including a flow control valve FC connects port B of valve V4 and a common line 459 for the corresponding ports 221 and 243 at the outer ends of cylinders 195C and 195D. A line 461 including a flow control valve FC connects port C of valve V4 and a common line 463 for the corresponding ports 219 and 241 at the inner ends of cylinders 195C and 195D. Ports D of valves V3 and V4 are vent ports, and are connected into the air exhaust system as indicated at 465.

Valve V5 is a conventional solenoid-operated three-way valve having a valve member therein and two solenoids V5a and V5b for actuating the valve member. On energization of solenoid V5a, the valve member shifts to a first position connecting a valve port A to a valve port B and blocking a valve port C, and on energization of solenoid V5b, the valve member shifts to a second position connecting port B to port C and blocking port A. Port A is a pressure port and has a connection 467 thereto from the main air supply line 417 downstream from the lubricator 423. Port B is connected to cylinder 323 by a line 469 including a flow control valve FC. Port C is a vent port, connected to exhaust system 425.

Valve V6 is a conventional air-operated four-way valve having a valve member therein normally held by a spring in a first position connecting a valve port A to a valve port B and connecting a valve port C to a valve port D, and movable on admission of compressed air through a pilot port E to a second position connecting port A to port C, and port B to port D. Port A is a pressure port and has main air supply line 417 connected thereto. A line 471 including a flow control valve FC connects port B to port 395 at the upper end of the pump operating cylinder 363. A line 473 including a flow control valve FC connects port C to the port 397 at the lower end of cylinder 363. Port D is a vent port, connected into exhaust system 425.

Valve V7 is a conventional three-way solenoid valve having a valve member therein and a solenoid V7a for actuating the valve member. When the solenoid is deenergized, the valve member occupies a position connecting port A of valve V7 to an exhaust port C (which may be connected into the exhaust system 425) and blocking a port B. When the solenoid is energized, port A is connected to port B and port C is blocked. A line 475 connects port B of valve V2 to port A of valve V7, and a line 477 including a restriction 479 provided by a needle valve connects port B of valve V7 to port E of valve V6. A line 481 including a restriction 483 provided by a needle valve connects port B of valve V2 to port E of valve V1.

FIG. 20 shows the electrical system for the apparatus. As shown therein, electrical power is supplied via main power lines L1 and L2 having a plug 501 for plugging into a suitable source. A ground line is indicated at L3. An on-off main power switch is indicated at 503, and a circuit breaker at 505. At 507 is indicated an impulse ratchet relay. This comprises a pair of fixed contacts 509 and 511 and a movable contact member 513 adapted on successive impulses of current to an electromagnet 515 of the relay to engage first one and then the other of contacts 509, 511. Electromagnet 515 is operative on a pivoted armature 517 which acts as a pawl for actuating a ratchet 521 on each actuation of the armature. Ratchet 521 is mounted on a shaft 523 carrying an actuating member 525 for the movable contact member 513. The arrangement is such that each time electromagnet 515 is impulsed, movable contact member 513 shifts from that one of fixed contacts 509 or 511 it may be on to the other fixed contact. A line 527 including an on-off toggle switch 529 connects line L1 and one terminal of switch 271 (which is normally open). A line 531 connects the other terminal of switch 271 and movable contact 513 of the impulse ratchet relay 507. A line 533 connects fixed contact 509 of the relay to one terminal of solenoid V3a and a line 535 connects fixed contact 511 of the relay to one terminal of solenoid V4a. The other terminals of these solenoids are connected by lines 537 and 539 to a line 541 returning to line L2.

A line 543 connects line 527 to one terminal of switch 171 and a line 545 extending from the other terminal of switch 171 has a branch connected to one terminal of solenoid V3b and a branch connected to one terminal of solenoid V4b. The other terminals of these solenoids are connected by lines 551 and 553 to return line 541.

A line 555 connects line 527 to one terminal of switch 173. A line 557 is connected to the other terminal of switch 173 and has a branch line 559 to one terminal of solenoid V2b and a branch line 561 to one terminal of solenoid V5b. A line 563 connects the other terminal of solenoid V2b back to line L2 via return line 541, and a line 565 connects the other terminal of solenoid V5b to line 563.

A line 567 including an on-off toggle switch 569 connects the terminal of switch 171 to which line 545 is connected to one terminal of solenoid V2a and a line 571 connects the other terminal of this solenoid to line 563. A line 573 is connected to line 567 to be in series with switch 569 and leads to one terminal of electromagnet 515 of relay 507. The other terminal of the electromagnet is connected by a line 575 including an on-off toggle switch 577 to line 541.

Solenoid V7a is connected across lines L1 and L2 as indicated at 579 in series with an on-off toggle switch 581. When the apparatus is put into operation, switch 581 is turned on and remains on to hold solenoid V7a energized, thereby to hold valve V7 on in position for supplying compressed air from line 475 via ports A and B of valve V7 to port E of valve V6.

At 583 is indicated a conventional photocell control which includes a photocell-controlled switch 585. This control is connected across lines L1 and L2 as indicated at 587 in series with an on-off toggle switch 589. Connections such as indicated at 591 and 593 are made from control 583 to the lamp 293 and photocell 295. Switch 585 is normally open, and is closed whenever web W stops in a position wherein a mark M on the web nullifies the reflection of light from the lamp to the photocell. Solenoid V5a is connected across lines L1 and L2 in series with switch 585 and switch 171 by a connection to line 567 as indicated at 595 and a connection 597.

The heater 139 in side sealer bar 3A is supplied with current as indicated at 599. This system includes a conventional temperature indicator and control 601, responsive to a probe in side sealer bar 3A connected to control 601 as indicated at 603. The heaters 203 in end sealer bars 5A and 5C are supplied with current as indicated at 605. This system includes a conventional temperature indicator and control 607 responsive to probes in the end sealer bars 5A and 5C connected to control 607 as indicated at 609. An electrically impulsed counter 611 may be provided for counting the number of packages produced. This is shown as connected across lines 557 and 563.

Operation is as follows:

As will be understood from the above, web W passes from web roll R around roll 63, thence over plate 62 (where it passes under photocell 295), under roll 66, thence to roll assembly 67, and down toward the mandrel 1. As it passes down toward the mandrel, it starts to curve into tubular form around the mandrel. The side margins of the web are brought into inside-face-to-inside-face relation at rolls 85 of the tube-forming means 69, and here the formation of the web into the form of tubing T is completed, to be followed by sealing together of the margins to form the inside-face-to-inside-face longitudinal seam L. This sealing is effected on each downstroke of carriage 45.

As carriage 45 moves downward, the side sealers 3A and 3B are closed on the side margins of the web, and act to effect sealing thereof to form the longitudinal seam L. The side sealers 3A and 3B, in addition to acting to seal the margins of the web, also act as clamps on the longitudinal seam to effect downward feed of tubing T (and accompanying withdrawal of web W from roll R) through a package length increment. The length of stroke of the carriage 45 (which determines the package length) is determined by the positioning of block 71 on post 43.

A cycle of operation may be considered as starting with the carriage 45 moving downward from the upper limit of its stroke (as determined by the elevation of block 71). The carriage moves downward with side sealers 3A and 3B closed to effect the downward feed of tubing T through a package length increment. End sealers 5A–5D are open as the carriage moves downward, thereby to allow tubing T to be fed downward. As the carriage nears the lower limit of its stroke, the tapered lower end 281 of cam 273 on the carriage effects closure of switch 271, and cam 273 then holds this switch closed as the carriage completes its downward movement. Upon closure of switch 271, and with toggle switch 529 closed, one or the other of solenoids V3a or V4a is energized, depending on the position of movable contact member 513 of the impulse ratchet relay 507. Assuming that member 513 is in engagement with contact 509 of the ratchet relay, solenoid V3a is energized, a circuit being completed from line L1 via line 527 (switch 529 being closed), switch 271 (which is closed), line 531, contact member 513, contact 509, line 533, solenoid V3a, line 537 and line 541 to line L2. Upon energization of solenoid V3a, the valve member of valve V3 shifts to connect port A of this valve to its port B and to connect its port C to its port D. Referring to FIG. 19, it will be seen that compressed air is then supplied from line 445 via ports A and B and lines 449 and 451 to the outer ends of cylinders 195A and 195B, and vented from the inner ends of these cylinders via lines 455 and 453 and ports C and D, to start end sealers 5A and 5B moving inward toward one another to pinch the tubing T and form a transverse heat seal E1 across the tubing.

Closure of end sealers 5A and 5B is completed as the carriage 45 reaches the lower limit of its stroke. This is determined either by bumping of button 147 against plate 19, when carriage stop 331 is retracted, or by bumping of button 147 against carriage stop 331 when the latter is advanced (as will appear). Cushion cylinder 149 acts as a dashpot to cushion the impact. As the carriage completes its downward stroke, the lower switch actuator 177 thereon closes switch 173. Upon closure of switch 173, solenoid V2b is energized, a circuit being completed from line L1 via lines 527 and 555, switch 173, lines 557 and 559, solenoid V2b, and lines 563 and 541 to line L2. This results in shifting of the valve member of valve V2 to connect its port B to its port C and to block its port A. Referring to FIG. 19, it will be seen that this vents the side seal cylinders 127 via line 443 and ports B and C to the exhaust system 425. Springs 134 in the side seal cylinders 127 thereupon retract (open) the side sealers 3A and 3B to permit the carriage to return upward. Also, pilot port E of valve V1 is vented via line 481 and ports B and C of valve V2 to the exhaust system. The spring of valve V1 then shifts its valve member to connect its port A to its port B and to connect its port C to its port D. Referring to FIG. 19, it will be seen that this results in compressed air being supplied from line 415 via ports A and B of valve V1 and line 433 to the port 47b at the lower end of the carriage-reciprocating cylinder 47, and air being vented through the port 47a at the upper end of cylinder 47 via line 429 and ports C and D to the exhaust system. Carriage 45 thereupon starts moving upward, side sealers 3A and 3B being open. End sealers 5A and 5B remain closed to form a good transverse package-end-forming seal E1 during the dwell interval of the tube T and web W as the carriage moves upward.

As the carriage moves upward, switch 271 opens. The carriage ultimately bumps button 185 on piston rod 183 of the upper cushion cylinder 179, and this cushions the impact of the carriage as it completes its upstroke. The upper switch actuator 175 on the carriage closes switch 171. Upon closure of this switch, solenoid V3b of valve V3 is energized, the circuit therefor being from line L1 via lines 527 and 543, switch 171, line 545, solenoid V3b and line 541 to line L2. This shifts the valve member of valve V3 to connect its port A to its port C and its port B to its port D. Referring to FIG. 19, it will be seen that compressed air is then supplied from line 445 via ports A and C and lines 453 and 455 to the inner ends of cylinders 195A and 195B, and air is vented from the outer ends of these cylinders via lines 451 and 449 and ports B and D to retract (open) end sealers 5A and 5B.

Also, on closure of switch 171, solenoid V2a is energized, the circuit therefor being from line L1 via lines 527 and 543, switch 171, line 567 (switch 569 being closed) solenoid V2a, and lines 571, 563 and 541 to line L2. The valve member of valve V2 thereupon shifts to connect its port A to its port B and to block its vent port C. Compressed air is thereupon supplied from line 441 via ports A and B of valve V2 and line 443 to the side seal cylinders 127 to close the side sealers 3A and 3B. In response to the stated actuation of valve V2, compressed air is supplied from line 441 via ports A and B of valve V2 and line 481 to the pilot port E of valve V1. This shifts the valve member of valve V1 to connect its port A to its port C and to connect its port B to its port D. Compressed air is thereupon supplied from line 415 via ports A and C of valve V1 and line 429 to the upper end of cylinder 47, and air is vented from the lower end of cylinder 47 via line 433 and ports B and D of valve V1. Carriage 45 is thereupon driven downward. Further in response to the stated actuation of valve V2, compressed air is delivered from line 441 via ports A and B of valve V2, line 475. from ports A and B of valve V7 and line 477 to pilot port E of valve V6. This shifts the valve member of valve V6 to connect its port A to its port C, and to connect its port B to its port D. Compressed air is thereupon supplied from line 417 via ports A and C of valve V6 and line 473 to port 397 at the lower end of pump-operating cylinder 363, and air is vented through port 395 at the upper end of cylinder 363 via line 471 and ports B and D of valve V6. This effects operation of pump 341 through a pressure stroke to deliver a measured charge of product through filler pipe 36 into the lower end of tubing T (closed by the previously formed seal E1).

Additionally, on closure of switch 171, a current impulse is delivered to electromagnet 515 of ratchet relay 507, the circuit therefor being from line L1 via lines 527 and 543, switch 171, line 567 (switch 569 being closed), line 573, electromagnet 515, line 577 (switch 577 being closed) and line 541 to line L2. This results in actuation of armature 517 to step the ratchet 521 and swing movable contact member 513 of the relay off contact 509 and on to contact 511.

Now, with the carriage 45 moving downward, and with side sealers 3A and 3B closed and end sealers 5A–D open, the cycle is repeated, except that when switch 271 is closed as the carriage approaches the end of its downstroke, end sealers 5C and 5D are actuated instead of end sealers 5A and 5B. This action occurs by reason of the preceding shift of movable contact member 513 of relay 507 from contact 509 to 511, so that, on closure of switch 271, solenoid V4a is energized (instead of solenoid V3a). The circuit therefore is from line L1 via line 57 (switch 529 being closed), switch 271 (which is closed), line 531, contact member 513, contact 511, line 535, solenoid V4a, line 539 and line 541 to line L2. Upon energization of solenoid V4a, the valve member of valve V4 shifts to connect its port A to its port B and to connect its port C to its port D. Compressed air is thereupon supplied from line 445 via ports A and B of valve V4 and lines 457 and 459 to the outer ends of cylinders 195C and 195D, and vented from the inner ends of these cylinders via lines 463 and 461, to start end sealers 5C and 5D moving inward toward one another to pinch the tubing T and form a transverse seal E2 across the tubing in a vertical plane at right angles to seal E1.

Closure of end sealers 5C and 5D is completed as the carriage reaches the lower limit of its stroke. Upon closure of switch 173 as the carriage reaches the end of its downstroke, operation is the same as above described, except that end sealers 5C and 5D now remain closed (instead of end sealers 5A and 5B) until the carriage reaches the upper end of its stroke. Then, upon closure of switch 171, solenoid V4b of valve V4 is energized (instead of V3b as in the preceding cycle). The circuit therefore is from line L1 via lines 527 and 543, switch 171, line 545, solenoid V4b, and lines 553 and 541 to line L2. This shifts the valve member of valve V4 to connect its port A to its port C and to connect its port B to its port D. Compressed air is thereupon supplied from line 445 via ports A and C of valve V4 and lines 461 and 463 to the inner ends of cylinders 195C and 195D and air is vented from the outer ends of these cylinders via lines 459 and 457 and ports B and D to retract (open) end sealers 5C and 5D. Also upon closure of switch 171, electromagnet 515 is pulsed to step ratchet 521 to move contact member 513 off contact 511 back on to contact 509 so that, on the next downstroke of the carriage, end sealers 5A and 5B are actuated.

Until a mark M nullifies reflection of light to photocell 295, the lower limit of travel of carriage 45 is determined by engagement of button 147 with plate 19 (reversal of the carriage occurring substantially immediately upon such engagement). As previously pointed out, block 71 is positioned on post 43 at such an elevation that the total stroke of the carriage from its upper limit to this lower limit is slightly greater than the predetermined package length. Whenever a mark M nullifies the reflection of light to the photocell, switch 585 closes. When switch 171 then closes, solenoid V5a is thereupon energized, a circuit being completed from line L1 via lines 527 and 543, switch 171, lines 567 and 595 (switch 585 being closed) and connections 597 and 587 (switch 589 being closed) to line L2. This shifts the valve member of valve V5 to connect its port A to its port B and to block its port C. Compressed air is thereupon delivered from line 467 via ports A and B of valve V5 and line 469 to the outer end of cylinder 323 to slide the stop 331 forward into position in the path of button 147. This results in the next downstroke of the carriage 45 being shortened to effect web registration correction. When switch 173 closes at the end of this downstroke, solenoid V5b of valve V5 is energized (switch 171 having opened to deenergize solenoid V5a), a circuit being completed from line L1 via lines 527 and 555, switch 173, lines 557 and 561, solenoid V5b, and lines 565, 563 and 541 to line L2. This shifts the valve member of valve V5 back to connect its ports B to its port C and to block port A. This vents cylinder 323 via line 469 and ports B and C of valve V5 for retraction of the stop.

It will be observed that each time solenoid V2b is energized to shift the valve member of valve V2 to position connecting its port B to its port C and blocking port A, pilot port E of valve V6 is vented via line 477, ports B and A of valve V7, line 475 and ports B and C of valve V2. The valve member of valve V6 then shifts to position connecting its port A to its port B and connecting its port C to its port D. Compressed air is then supplied from line 417 via these ports A and B and line 471 to the upper end of cylinder 363 and vented from the lower end of cylinder 363 via line 473 and ports C and D of valve V6. This drives piston rod of cylinder 363 downward to retract the piston of filler pump 341 thereby to charge the filler pump.

The operating button of switch 173 has sufficient overtravel that closure of switch 173 is effected by actuator 177 on a shortened downstroke of carriage 45 (i.e., when carriage stop 331 is in advanced position) as well as on a normal full downstroke of the carriage. While switch 173 may close slightly before the carriage 45 reaches the lower limit of its normal full downstroke, there is such lag that the carriage still bottoms, and side sealers 3A and 3B open substantially as the carriage bottoms.

As will be seen, the end seal and cutter mechanism is such that there is a resiliently yieldable lost-motion connection between each piston rod 239 and the respective end sealer head 5B or 5D. When either piston rod 239 moves inward, the respective head 5B or 5D moves inward with it (without relative motion therebetween) until the head stops by reason of the pinch on the tube T. Then, by reason of the lost-motion connection, the piston rod continues its inward movement and resilient gripping of the tube T is effected by action of yoke 245 through spring 251 on slider 246. Also, the continued inward movement of the piston rod effects extension of the cutter 233 to effect the cutting of the tube T.

While as shown herein, provision is made for filling the packages with a liquid or semiliquid, it will be understood that the apparatus is readily adaptable for filling the packages with other substances, such as powders. In such case, a suitable powder filling mechanism is used instead of the filling system including pump 341.

The apparatus is adaptable for making flat packs, if desired, simply by leaving switch 577 open under such circumstances, ratchet relay 507 is not impulsed and only one pair of end sealers 5A, 5B or 5C, 5D is actuated, depending on the position of movable contact member 513 of the relay, on each successive cycle. Thus, if member 513 is on contact 509, it will remain there, and end sealers 5A, 5B will be actuated on successive cycles thereby producing flat packs instead of tetrahedral packs as when, with switch 577 closed, alternate operation of sealers 5A, 5B and sealers 5C, 5D is obtained on successive cycles.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of making packages from a continuous web of flexible packaging material comprising forming the web into a tube by bringing its side margins together and sealing them to form a longitudinal tube seam extending lengthwise of the tube, intermittently feeding the tube forward in single package length increments with dwell intervals between successive feeding operations, the tube being maintained against rotation around its axis as it is fed forward thereby maintaining said longitudinal seam straight and extending lengthwise of the tube, and making package-end-forming seals across the tube during said dwell intervals by bringing sealing instrumentalities into engagement with the tube starting at the beginning of each dwell interval and maintaining said instrumentalities in engagement with the tube until near the end of the dwell interval, and withdrawing the said instrumentalities at the end of each dwell interval to permit the next forward feed of the tube.

2. The method of claim 1 wherein successive package-end-forming seals are formed in different planes and alternate package-end-forming seals are formed in the same plane so that the packages are of tetrahedral shape.

3. The method of claim 1 wherein the web is heat-sealable on one side and is formed into the tube with its heat-sealable side on the inside and with its said margins in inside-face-to-inside-face relation and projecting outward from the tube, said margins being heat-sealed together in said relation to form said longitudinal tube seam, said package-end-forming seals being made as inside-face-to-inside-face heat seals during said dwell intervals.

4. The method of claim 3 wherein successive package-end-forming seals are formed in different planes and alternate package-end-forming seals are formed in the same plane so that the packages are of tetrahedral shape, the plane of said longitudinal tube seam lying diagonally with respect to the planes of said package-end-forming seals, the longitudinal tube seam being folded over on the outside of the tube prior to the formation of the package-end-forming seals.

5. The method of making packages from a continuous web of flexible packaging material comprising forming the web into a tube by bringing its side margins together and sealing them to form a longitudinal tube seam extending lengthwise of the tube, intermittently feeding the tube forward in single package length increments with dwell intervals between successive feeding operations, the tube being maintained against rotation around its axis as it is fed forward thereby maintaining said longitudinal seam straight and extending lengthwise of the tube, and making package-end-forming seals across the tube during said dwell intervals, wherein the web is heat-sealable on one side and is formed into the tube with its heat-sealable side on the inside and with its said margins in inside-face-to-inside-face relation and projecting outward from the tube, said margins being heat-sealed together in said relation to form said longitudinal tube seam, said package-end-forming seals being made as inside-face-to-inside-face heat seals during said dwell intervals, and wherein the margins of the web are heat-sealed together to form said longitudinal tube seam and the tube is fed forward by clamping said margins together, applying heat thereto, and simultaneously pulling said margins forward through said single package length increment.

6. The method of claim 5 wherein successive package-end-forming seals are formed in different planes and alternate package-end-forming seals are formed in the same plane so that the packages are of tetrahedral shape, the plane of said longitudinal tube seam lying diagonally with respect to the planes of said package-end-forming seals, the longitudinal tube seam being folded over on the outside of the tube prior to the formation of the package-end-forming seals, a charge of the product to be contained in the package being delivered into the tube during each interval between formation of successive package-end-forming seals, each package being segmented from the tube by cutting through the package-end-forming seals.

7. Packaging apparatus comprising a downwardly extending tubular mandrel, means for forming a continuous web of flexible packaging material which is heat-sealable on one side into a tube around the mandrel with the heat-sealable side of the web on the inside and with the margins of the web in inside-face-to-inside-face relation and projecting outward from the tube, a carriage reciprocable up and down parallel to the mandrel in single package length increment strokes, heat-sealing means carried by the carriage movable into and out of engagement with said margins, said sealing means being adapted to engage and seal said margins together to form a longitudinal tube seam and to feed the tube downward off the lower end of the mandrel in said single package length increments on downstrokes of the carriage, and heat-sealing means located below the lower end of the mandrel for forming a transverse inside-face-to-inside-face seal across the tube during dwell of the tube occurring on each upstroke of the carriage.

8. Packaging apparatus as set forth in claim 7 wherein said heat-sealing means for forming the transverse seals comprises first and second pairs of transverse heat sealers, the transverse heat sealers of each pair being movable toward and away from each other, said pairs being operable generally at right angles one to the other in a fixed plane below the lower end of the mandrel, and means for alternately operating said pairs during successive upstrokes of the carriage to produce packages of tetrahedral shape.

9. Packaging apparatus as set forth in claim 8 further comprising means for delivering through the mandrel a charge of the product with which the packages are to be filled during dwell of the tube occurring on each upstroke of the carriage.

10. Packaging apparatus as set forth in claim 9 further comprising cutting means associated with the transverse heat sealers for cutting through the transverse seals to segment each package from the tube.

11. Packaging apparatus as set forth in claim 10 for operation on a web having matter recurring at package length intervals thereon for varying the stroke of the carriage to maintain registration of said matter relative to the transverse seals and the cuts through the transverse seals.

12. Packaging apparatus as set forth in claim 7 wherein the stroke of the carriage is adjustable for forming packages of different length.

13. Packaging apparatus as set forth in claim 7 having fluid pressure means for reciprocating the carriage, fluid pressure means on the carriage for actuating the sealing means on the carriage, and fluid pressure means for actuating the transverse heat-sealing means.

14. Packaging apparatus as set forth in claim 13 having electrical means for controlling operation of the fluid pressure means for reciprocating the carriage including upper and lower limit switches operable by the carriage at the upper and lower limits of its stroke for effecting reversal of movement of the carriage.

15. Packaging apparatus as set forth in claim 14 wherein one of said limit switches is mounted for adjustment to vary the stroke of the carriage.

16. Packaging apparatus as set forth in claim 15 wherein the upper limit switch is mounted for said adjustment.

17. Packaging apparatus as set forth in claim 16 wherein the tube-forming means is associated with the upper limit switch for conjoint adjustment of said tube-forming means and said upper limit switch.

18. In apparatus for making tetrahedron-shaped packages in which continuous web material is formed into a tube around a downwardly extending mandrel and fed downward off the lower end of the mandrel in package length increments, and in which first and second pairs of sealers are provided for making transverse seals across the tube below the lower end of the mandrel with successive seals in different planes and alternate seals in the same plane, a first electrically actuated means for controlling the first pair of sealers, a second electrically actuated means for controlling the second pair of sealers, and a control circuit for effecting alternate actuation of said first and second sealers comprising means operable in timed relation to the feeding of the tube for supplying current for energizing one or the other of said electrically actuated means, switching means interconnected with said current-supplying means operable between a first position for directing current to said first electrically actuated means and a second position for directing current to said second electrically actuated means, and means operative following each operation of the first pair of sealers for operating said switching means from its first to its second position and operative following each operation of the second pair of sealers for operating said switching means from its second to its first position.

19. In apparatus as set forth in claim 18, each pair of sealers being operated by fluid pressure means, each electrically actuated means comprising an electrically actuated valve for controlling the fluid pressure means for the respective pair of sealers.

20. In packaging apparatus, means for making transverse seals across a tube of flexible packaging material comprising a pair of sealing heads movable away from a retracted position toward one another to pinch the tube and movable back to retracted position, a pair of stationary cylinders, one for each head, each cylinder having a piston therein and a piston rod extending from the cylinder for moving the respective head, each rod having a resiliently yieldable lost-motion connection with the respective head, one of said heads having a cutter associated therewith movable from a retracted position within said one head into a slot in the other head, said cutter having a fixed connection with the piston rod for said one head.

21. Packaging apparatus comprising a downwardly extending tubular mandrel, means for forming a continuous web of flexible packaging material into a tube around the mandrel and intermittently feeding the tube downward off the lower end of the mandrel in single package length increments with dwell intervals between successive feeding operations, said means being operative to bring the side margins of the web together into inside-face-to-inside-face relation and projecting outward from the tube in a predetermined plane and to seal said margins together thereby to form a longitudinal tube seam extending lengthwise of the tube, first and second pairs of transverse sealers located below the lower end of the mandrel for forming transverse seals across the tube, the transverse sealers of each pair being relatively movable toward and away from each other, said pairs being operable on working axes generally at right angles to one another in a fixed plane below the lower end of the mandrel, and being so located relative to the means for forming the web into a tube that the plane of the longitudinal tube seam lies diagonally with respect to the working axes of said pairs, and means operable upon downward feed of a single package length increment of the tube for effecting operation of first one and then the other of said pairs of transverse sealers upon completion of the downward feed of the tube and during the ensuing dwell interval.

22. Packaging apparatus as set forth in claim 21 for operation on a web which is heat-sealable on one side, wherein said means for forming the web into the tube is adapted to form the web into the tube with the heat-sealable side of the web on the inside and with its margins in inside-face-to-inside-face relation projecting outward from the tube, and to heat-seal said margins together in said relation to form said longitudinal tube seam, and wherein said transverse sealers are adapted to heat-seal together opposed walls of the tube in inside-face-to-inside-face relation.

References Cited by the Examiner
UNITED STATES PATENTS

| | | | |
|---|---|---|---|
| 3,026,658 | 3/1962 | Schneider et al. | 53—28 |
| 3,027,695 | 4/1962 | Leasure | 53—28 |
| 3,071,907 | 1/1963 | Jarund | 53—180 |
| 3,082,586 | 3/1963 | Schneider et al. | 83—182 |
| 3,091,902 | 6/1963 | Reinhardt et al. | 53—28 |

FRANK E. BAILEY, *Primary Examiner.*

BROMLEY SEELEY, *Examiner.*